US010798321B2

United States Patent
McElvain

(10) Patent No.: US 10,798,321 B2
(45) Date of Patent: Oct. 6, 2020

(54) BIT-DEPTH EFFICIENT IMAGE PROCESSING

(71) Applicant: Dolby Laboratories Licensing Corporation, San Francisco, CA (US)

(72) Inventor: Jon S. McElvain, Manhattan Beach, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/637,197

(22) PCT Filed: Aug. 14, 2018

(86) PCT No.: PCT/US2018/046783
§ 371 (c)(1),
(2) Date: Feb. 6, 2020

(87) PCT Pub. No.: WO2019/036522
PCT Pub. Date: Feb. 21, 2019

(65) Prior Publication Data
US 2020/0228736 A1   Jul. 16, 2020

Related U.S. Application Data

(60) Provisional application No. 62/545,557, filed on Aug. 15, 2017.

(30) Foreign Application Priority Data

Aug. 15, 2017  (EP) ..................................... 17186275

(51) Int. Cl.
*H04N 5/355*  (2011.01)
*H04N 5/378*  (2011.01)

(52) U.S. Cl.
CPC ......... *H04N 5/35509* (2013.01); *H04N 5/378* (2013.01)

(58) Field of Classification Search
CPC .. H04N 5/35509; H04N 5/378; H04N 19/186; H04N 5/2355; H04N 19/60;
(Continued)

(56) References Cited

U.S. PATENT DOCUMENTS 5,528,339 A   6/1996  Buhr
7,632,016 B1  12/2009 Huang
(Continued)

FOREIGN PATENT DOCUMENTS

WO   2016164235   10/2016
WO   2016184532   11/2016
WO   2017003525   1/2017

OTHER PUBLICATIONS

Borer, T. et al "A "Display Independent" High Dynamic Range Television System" Sep. 11-15, 2015, IBC, Amsterdam, pp. 3-4.
(Continued)

*Primary Examiner* — Chiawei Chen

(57) ABSTRACT

A computer-implemented method for bit-depth efficient image processing includes a step of communicating at least one non-linear transformation to an image signal processor. Each non-linear transformation is configured to, when applied by the image signal processor to a captured image having sensor signals encoded at a first bit depth, produce a nonlinear image that re-encodes the captured image at a second bit depth that may be less than the first bit depth, while optimizing allocation of bit depth resolution in the nonlinear image for low contour visibility. The method further includes receiving the nonlinear image from the image signal processor, and applying an inverse transformation to transform the nonlinear image to a re-linearized image at a third bit depth that is greater than the second bit (Continued)

depth. The inverse transformation is inverse to the nonlinear transformation used to produce the nonlinear image.

20 Claims, 21 Drawing Sheets

(58) Field of Classification Search
CPC .... H04N 19/184; H04N 21/2662; H04N 1/56; H04N 19/98; G06T 2207/20208; G06T 5/007
See application file for complete search history.

(56) References Cited

U.S. PATENT DOCUMENTS

| | | | |
|---|---|---|---|
| 7,652,788 B2 | 1/2010 | Foi | |
| 7,680,312 B2 | 3/2010 | Jolly | |
| 7,860,168 B2* | 12/2010 | Winger | H04N 19/105 375/240.24 |
| 8,711,255 B2 | 4/2014 | Yamashita | |
| 8,848,091 B2 | 9/2014 | Baraniuk | |
| 8,948,812 B2 | 2/2015 | Dey | |
| 9,268,315 B2 | 2/2016 | Gao | |
| 9,668,768 B2 | 6/2017 | Piron | |
| 9,716,887 B2 | 7/2017 | Atkins | |
| 2003/0123744 A1* | 7/2003 | Chui | H04N 19/132 382/240 |
| 2006/0146930 A1* | 7/2006 | Kim | H04N 19/184 375/240.03 |
| 2006/0257034 A1* | 11/2006 | Gish | H04N 19/126 382/239 |
| 2009/0097549 A1* | 4/2009 | Kim | H04N 19/30 375/240.03 |
| 2009/0110054 A1* | 4/2009 | Kim | H04N 19/33 375/240.1 |
| 2011/0090959 A1* | 4/2011 | Wiegand | H04N 19/36 375/240.12 |
| 2012/0224774 A1* | 9/2012 | Lim | H04N 19/44 382/233 |
| 2014/0327695 A1 | 11/2014 | Suzuki | |
| 2017/0142424 A1* | 5/2017 | Jun | H04N 19/167 |
| 2019/0228253 A1* | 7/2019 | Ramaswamy | H04N 21/23439 |

OTHER PUBLICATIONS

Francois, E. et al "AHG 14: Suggested Draft Text for HDR/WCG Technology for SDR Backward Compatibility, Display Adaptation, and Quality Enhancement Processing" 25th Meeting: Chengdu, CH, Oct. 14-21, 2016, pp. 1-17.

Miller, S. et al "Perceptual Signal Coding for More Efficient Usage of Bit Codes" Oct. 23-25, 2012, IEEE Annual Technical Conference & Exhibition.

Nezamabadi, M. et al "Color Signal Encoding for High Dynamic Range and Wide Color Gamut Based on Human Perception" SPIE Electronic Imaging: Displaying, Processing, Hardcopy, and Applications, Feb. 3, 2014.

Schulte, T. et al "HDR Demystified—Emerging UHDTV Systems" SpectraCal, Portrait Displays, Mar. 2016.

Yin, P. et al "Candidate Test Model for HDR Extension of HEVC" MPEG Meeting, Oct. 2015, Geneva, Motion Picture Expert Group or ISO/IEC JTC1/SC29/WG11.

ITU-R BT.2100-1 "Image Parameter Values for High Dynamic Range Television for use in Production and International Programme Exchange" Jun. 2017, pp. 1-16.

* cited by examiner

800

COMMUNICATE, TO IMAGE SIGNAL PROCESSOR, A PLURALITY OF CAPTURE-MODE-SPECIFIC NON-LINEAR TRANSFORMATIONS EACH CONFIGURED TO, WHEN APPLIED BY IMAGE SIGNAL PROCESSOR TO CAPTURED IMAGE HAVING SENSOR SIGNALS ENCODED AT FIRST BIT DEPTH, PRODUCE NONLINEAR IMAGE THAT RE-ENCODES CAPTURED IMAGE AT SECOND BIT DEPTH WHILE OPTIMIZING ALLOCATION OF BIT DEPTH RESOLUTION IN THE NONLINEAR IMAGE FOR LOW CONTOUR VISIBILITY
810

COMMUNICATE CAPTURE-MODE-SPECIFIC NON-LINEAR TRANSFORMATIONS CONFIGURED TO DISTRIBUTE BIT DEPTH RESOLUTION, IN NONLINEAR IMAGE, ACCORDING TO SENSOR-SIGNAL-DEPENDENT CONTOUR VISIBILITY THRESHOLD
812

RECEIVE NONLINEAR IMAGE AND CORRESPONDING CAPTURE-MODE SPECIFICATION FROM IMAGE SIGNAL PROCESSOR
820

BASED UPON CAPTURE-MODE SPECIFICATION, APPLY TRANSFORMATION, INVERSE TO NONLINEAR TRANSFORMATION USED TO PRODUCE NONLINEAR IMAGE, TO TRANSFORM NONLINEAR IMAGE TO RE-LINEARIZED IMAGE
830

APPLY INVERSE TRANSFORMATION AT THIRD BIT DEPTH THAT IS GREATER THAN SECOND BIT DEPTH, WITH SECOND BIT DEPTH BEING LESS THAN FIRST BIT DEPTH
432

POST-PROCESS RE-LINEARIZED IMAGE
440

COMMUNICATE, TO CAMERA, (A) SPECIFICATION OF CAPTURE MODE TO BE USED BY IMAGE SENSOR TO CAPTURE IMAGE AND (B) AN ASSOCIATED CAPTURE-MODE-SPECIFIC NON-LINEAR TRANSFORMATION CONFIGURED TO, WHEN APPLIED BY IMAGE SIGNAL PROCESSOR TO CAPTURED IMAGE HAVING SENSOR SIGNALS ENCODED AT FIRST BIT DEPTH, PRODUCE NONLINEAR IMAGE THAT RE-ENCODES CAPTURED IMAGE AT SECOND BIT DEPTH WHILE OPTIMIZING ALLOCATION OF BIT DEPTH RESOLUTION IN THE NONLINEAR IMAGE FOR LOW CONTOUR VISIBILITY
910

COMMUNICATE CAPTURE-MODE-SPECIFIC NON-LINEAR TRANSFORMATION CONFIGURED TO DISTRIBUTE BIT DEPTH RESOLUTION, IN NONLINEAR IMAGE, ACCORDING TO SENSOR-SIGNAL-DEPENDENT CONTOUR VISIBILITY THRESHOLD
912

RECEIVE NONLINEAR IMAGE FROM IMAGE SIGNAL PROCESSOR
720

BASED UPON CAPTURE-MODE SPECIFICATION, APPLY TRANSFORMATION, INVERSE TO NONLINEAR TRANSFORMATION USED TO PRODUCE NONLINEAR IMAGE, TO TRANSFORM NONLINEAR IMAGE TO RE-LINEARIZED IMAGE
830

APPLY INVERSE TRANSFORMATION AT THIRD BIT DEPTH THAT IS GREATER THAN SECOND BIT DEPTH, WITH SECOND BIT DEPTH BEING LESS THAN FIRST BIT DEPTH
432

POST-PROCESS RE-LINEARIZED IMAGE
440

FIG. 9

BIT-DEPTH EFFICIENT IMAGE PROCESSING

CROSS REFERENCE TO RELATED APPLICATIONS

This application claims priority to U.S. Provisional Application No. 62/545,557 and European Patent Application No. 17186275.8, both filed Aug. 15, 2017, and incorporated by reference in their entirety herein.

TECHNICAL FIELD

The present application relates to wide dynamic range image generation.

BACKGROUND

A typical electronic camera, as for example incorporated in consumer electronic devices, includes an image sensor and an image signal processor (ISP). The image sensor has a plurality of photosensitive pixels that generate respective electronic signals in response to incident light. Readout circuitry integrated in the image sensor reads out these electronic signals, which are then processed by the ISP to generate a display-ready image. The ISP may perform a variety of functions such as background subtraction, noise reduction, correction of brightness non-uniformity, and final encoding of the image according to an industry standard, such as those described in ITU-R BT.2100, which is incorporated herein by reference in its entirety. For generation of color images with a single-chip image sensor, the image sensor includes a color filter array such that each photosensitive pixel is sensitive to only a portion of the full color spectrum. In such color cameras, the ISP applies a demosaicing algorithm to the incomplete color samples provided by the image sensor to produce a full color image at the full pixel resolution of the image sensor. The ISP may further perform color correction.

Display developers are working towards displays capable of displaying more and more natural looking images. For example, displays may have a high bit depth, such as 10 bits or 12 bits, to enable the displaying of images at a wide dynamic range, that is, a range from very dark to very bright. When attempting to display a wide dynamic range with a limited bit depth, one troubling artifact is the appearance of discrete contours in the image, especially when the displayed scene is of relatively uniform brightness. For example, a grey wall with a slight gradient in brightness may appear to have discrete steps in brightness as opposed to the real-life gradual brightness change. One way to mitigate this problem is to, instead of distributing the display bit depth linearly across the full brightness range, assigning the display bit depth resolution according to the human vision's capability to perceive brightness differences.

WO2016164235 (A1) describes systems and methods for in-loop, region-based, reshaping for the coding of high-dynamic range video. Using a high bit-depth buffer to store input data and previously decoded reference data, forward and backward, in-loop, reshaping functions allow video coding and decoding to be performed at a target bit depth lower than the input bit depth. Methods for the clustering of the reshaping functions to reduce data overhead are also presented.

Yin Peng et al. "Candidate test model for HDR extension of HEVC", 113. MPEG MEETING; 19 Oct. 2015-23 Oct. 2015, Geneva (Motion Picture Expert Group or ISO/IEC JTC1/SC09/WG11) no. m37269, 16 Oct. 2015, presents a candidate test model for HDR/WCG video compression. The two major tools proposed in this test model are adaptive reshaping and color enhancement filters. Both tools can work in various color spaces to improve coding efficiency of HDR/WCG video.

Tim Borer, Andrew Cotton: "A "Display Independent" High Dynamic Range Television System", IBC 2015 conference, 11-15 Sep. 2015, Amsterdam, presents an overview of the BBC's "Hybrid Log-Gamma" solution, designed to meet the requirements of high dynamic range television. The signal is "display independent" and requires no complex "mastering metadata." In addition to providing high quality high dynamic range (HDR) pictures it also delivers a high quality "compatible" image to legacy standard dynamic range (SDR) screens and can be mixed, re-sized and compressed using standard tools and equipment. Quantisation effects (or "banding") are analysed theoretically and confirmed experimentally. It is shown that quantisation effects are comparable or below competing HDR solutions.

Francois et al.: "AHG14: suggested draft text for HDR/WCG technology for SDR backward compatibility, display adaptation, and quality enhancement processing," Joint Collaborative Team on Video Coding (JCT-VC) of ITU-T SG 16 WP 3 and ISO/IEC JTC 1/SC 29/WG 11, 25th Meeting: Chengdu, CH, 14-21 Oct. 2016, relates to high dynamic range (HDR) and wide color gamut (WCG) video distribution, based on HEVC single-layer or dual-layer coding. The document provides a suggested draft text for HDR and WCG video processing guidelines, using HEVC signaling, for SDR backward compatibility, display adaptation capabilities, and quality enhancement processing. It includes a description of HEVC signaling mechanisms, and of pre-encoding, coding, and post-decoding steps, enabling to address these three features. For SDR backward compatibility, the usage of HEVC VUI and SEI messages with single-layer coding, and of dual-layer SHVC coding, is discussed.

WO2016184532 (A1) provides a mechanism for managing a picture. The picture comprises pixels, wherein pixel values of the pixels are represented with a first bitdepth. The method comprises converting the pixel values of the pixels represented with the first bitdepth into the pixel values represented with a second bitdepth, wherein the first bitdepth is smaller than the second bitdepth. The method comprises identifying a group of pixels among the pixels of the picture. The group of pixels comprises two pixels, wherein the two pixels are adjacent to each other along a direction, wherein pixel values of the group of pixels are equal to each other. The method comprises, for at least one of the two pixels, estimating a respective estimated pixel value based on a first pixel value and a second pixel value. The first and second pixel values are derived from two edge pixel values of two edge pixels, wherein each one of the two edge pixels is located along the direction and excluded from the group of pixels, and wherein each one of the two edge pixels is adjacent to a respective end of the group of pixels with respect to the direction.

SUMMARY

In an embodiment, a computer-implemented method for bit-depth efficient image processing includes a step of communicating at least one non-linear transformation to an image signal processor. Each non-linear transformation is configured to, when applied by the image signal processor to a captured image having sensor signals encoded at a first bit depth, produce a nonlinear image that re-encodes the captured image at a second bit depth that may be less than the first bit depth, while optimizing allocation of bit depth resolution in the nonlinear image for low contour visibility. The method further includes receiving the nonlinear image from the image signal processor, and applying an inverse transformation to transform the nonlinear image to a re-linearized image at a third bit depth that is greater than the second bit depth. The inverse transformation is inverse to the nonlinear transformation used to produce the nonlinear image.

For example, the non-linear transformation may be determined based on noise characteristics of the sensor signals. Said noise characteristics of the sensor signals may comprise a mapping of code value levels of the sensor signals to corresponding values of a noise standard deviation for said code value levels. The non-linear transformation may comprise a concave function for mapping initial code values of the captured image to optimized code values of the nonlinear image. Further, the non-linear transformation may be configured to produce the nonlinear image such that an average noise level of the nonlinear image is increased compared to an average noise level of the captured image.

Specifically, the non-linear transformation may allocate a relatively greater portion of the second bit depth to less noisy ranges of the sensor signals of the captured image, and may allocate a relatively smaller portion of the second bit depth to more noisy ranges of the sensor signals of the captured image. Alternatively or additionally, the non-linear transformation may allocate a relatively greater portion of the second bit depth to a lower range of the sensor signals, and may allocate a relatively smaller portion of the second bit depth to a higher range of the sensor signals.

In an embodiment, a product for bit-depth efficient image processing, includes machine-readable instructions encoded in non-transitory memory. The instructions include at least one non-linear transformation. Each nonlinear transformation is configured to transform a captured image, encoding sensor signals at a first bit depth, to produce a nonlinear image that re-encodes the sensor signals at a second bit depth that may be less than the first bit depth, while optimizing allocation of bit depth resolution in the nonlinear image for low contour visibility. The instructions further include, for each non-linear transformation, a corresponding inverse transformation. In addition, the instructions include (a) hardware instructions that, when executed by a processor, communicate the at least one non-linear transformation to an image signal processor, to enable the image processor to produce the nonlinear image from a captured image, and (b) application domain instructions including inverting instructions that, when executed by the processor, receive the nonlinear image from the image signal processor and apply the inverse transformation corresponding to the non-linear transformation used to produce the nonlinear image, to produce a re-linearized image at a third bit depth that is greater than the second bit depth.

In an embodiment, a method for bit-depth efficient analog-to-digital conversion of an image includes (a) receiving a plurality of analog signals representing light detected by a respective plurality of photosensitive pixels of an image sensor, and (b) converting the analog signals to digital signals at a first bit depth. The method further includes, prior to the step of converting, a step of applying a nonlinear transformation to the analog signals to optimize allocation of bit depth resolution, to the digital signals, for low contour visibility. Additionally, the method may include inverting the nonlinear transformation by applying a corresponding inverse transformation to the digital signals, the inverse transformation encoding the digital signals at a second bit depth that is greater than the first bit depth.

In an embodiment, an image sensor with bit-depth efficient analog-to-digital image conversion includes a plurality of photosensitive pixels for generating a respectively plurality of analog signals representing light detected by the photosensitive pixels. The image sensor further includes at least one analog-to-digital converter for converting the analog signals to digital and having a first bit depth. The image sensor also includes at least one analog preshaping circuit, communicatively coupled between the photosensitive pixels and the at least one analog-to-digital converter, for applying a nonlinear transformation to the analog signals to optimize allocation of bit depth resolution to the digital signals by the analog-to-digital converter for low contour visibility in presence of noise of the analog signals. The image sensor may further include at least one digital inverting circuit for inverting the nonlinear transformation by applying a corresponding inverse transformation to the digital signals. The inverse transformation encodes the digital signals at a second bit depth that is greater than the first bit depth.

BRIEF DESCRIPTION OF THE DRAWINGS

FIG. 8 illustrates a method for bit-depth efficient image processing effectuated from an application domain, such as the application domain of a cellular phone, which utilizes capture-mode-specific nonlinear transformations, according to an embodiment.

FIG. 9 illustrates a method for bit-depth efficient image processing effectuated from an application domain, such as the application domain of a cellular phone, which controls the capture mode and utilizes capture-mode-specific nonlinear transformations, according to an embodiment.

DESCRIPTION OF EXAMPLE EMBODIMENTS

Figure 1:
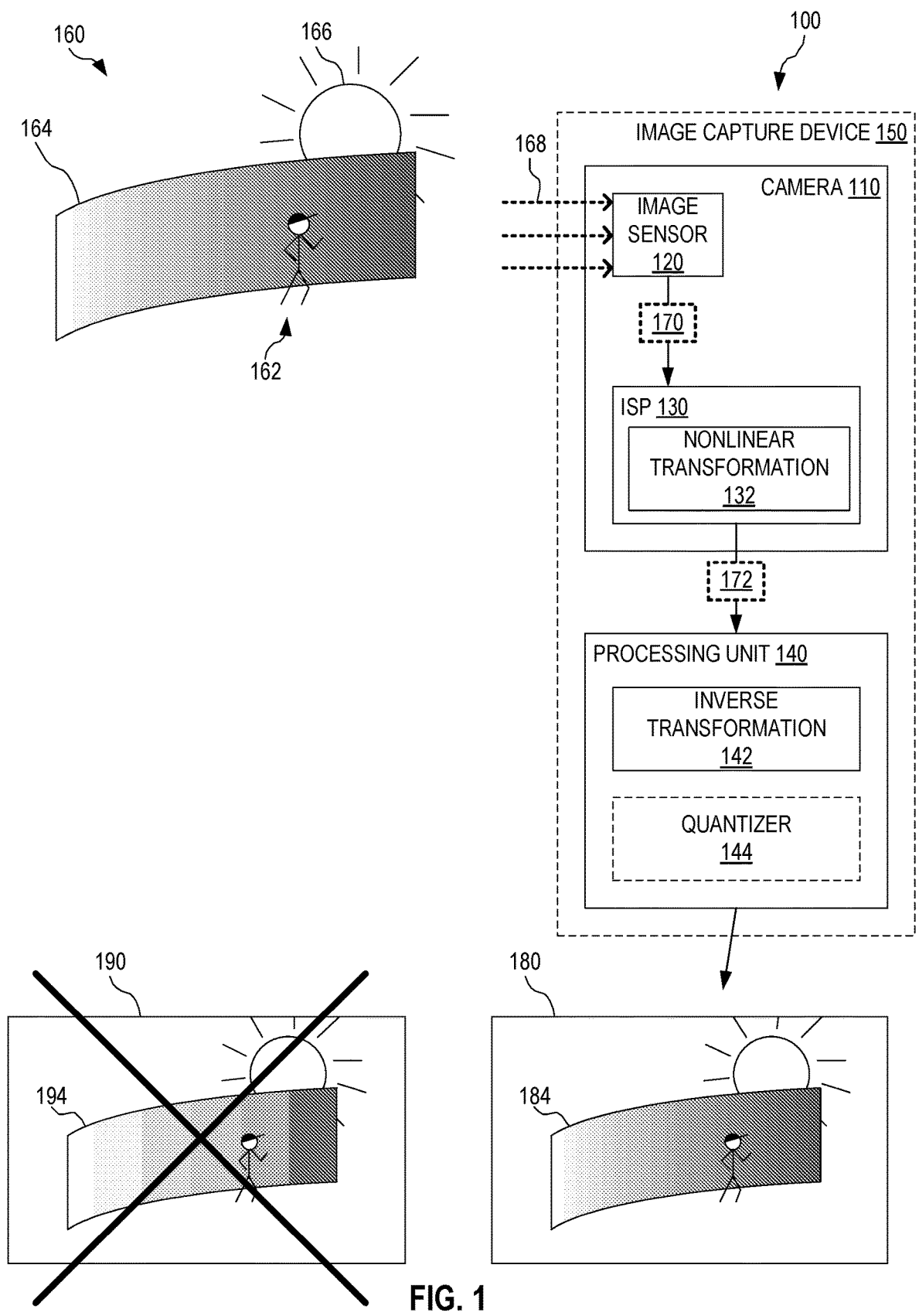
FIG. 1 illustrates a system for bit-depth efficient image processing, according to an embodiment.

FIG. 1 illustrates one example system 100 for bit-depth efficient image processing. System 100 includes a camera 110 and a processing unit 140. System 100 applies bit-depth efficient image processing to enable generation of wide dynamic range images even when the bit depth of the output of camera 110 presents a bottleneck. System 100 is compatible with wide dynamic range displays.

Camera 110 includes an image sensor 120 and an image signal processor (ISP) 130. Image sensor 120 generates a captured image 170 of a scene 160. Captured image 170 encodes electrical sensor signals of image sensor 120 at a first bit depth, such as 10 bits or 12 bits. Image sensor 120 generates these sensor signals in response to light 168 from scene 160.

The output of camera 110 is limited to a second bit depth. The second bit depth may be less than the first bit depth and therefore present a bottleneck in terms of bit depth resolution. In one embodiment, the second bit depth is 8 bits, which is a common bit depth of the output of off-the-shelf ISP integrated circuits. ISP 130 processes captured image 170 for efficient use of the second bit depth available at the output of camera 110. ISP 130 optimizes the bit depth allocation according to the contour visibility for different ranges of sensor signals to minimize contour visibility in images generated by system 100. More specifically, ISP 130 applies a nonlinear transformation 132 to captured image 170 to re-encode captured image 170 in a nonlinear image 172 at the second bit depth while nonlinearly distributing the sensor signals of captured image 170 across the second bit depth to minimize contour visibility.

In certain embodiments, nonlinear transformation 132 is configured to take into account the effect of noise on contour visibility. In one such embodiment, nonlinear transformation 132 is defined based upon a consideration of the native noise of image sensor 120. In another such embodiment, nonlinear transformation 132 is defined based upon a consideration of the native noise of image sensor 120 as well as the noise of other processing performed by camera 110 prior to application of nonlinear transformation 132. Regardless of the origin of the noise, noise tends to reduce contour visibility. Consequently, more noisy ranges of sensor signals are less susceptible to contour visibility, whereas less noisy ranges of sensor signals are more susceptible to contour visibility. Therefore, one embodiment of nonlinear transformation 132 distributes less noisy ranges of the sensor signals of captured image 170 over a relatively greater portion of the second bit depth than more noisy ranges of the sensor signals. In other words, this embodiment of nonlinear transformation 132 (a) allocates a relatively greater portion of the second bit depth to less noisy ranges of the sensor signals of captured image 170 and (b) allocates a relatively smaller portion of the second bit depth to more noisy ranges of the sensor signals. Since greater sensor signals generally are noisier than smaller sensor signals, nonlinear transformation 132 may allocate a relatively greater portion (e.g., 20%) of the second bit depth to the lower range of the sensor signals (e.g., the lowest 10% of the sensor signals).

Processing unit 140 includes an inverse transformation 142 that is the inverse transformation of nonlinear transformation 132. Processing unit 140 applies inverse transformation 142 to nonlinear image 172 to generate a re-linearized image 180 the re-encodes the sensor signals at a third bit depth. The third bit depth is greater than the second bit depth, for example 10 bits or 12 bits.

Nonlinear transformation 132 enables wide dynamic range image processing, optimized for low contour visibility, even though the bit depth of the output of camera 110 (the second bit depth) may be less than the bit depth of image sensor 120 (the first bit depth). In the absence of nonlinear transformation 132, the bit depth would likely be insufficient to avoid visible contours in the final images, at least for scenes with one or more areas of relatively uniform luminance.

In the example shown in FIG. 1, scene 160 features a runner 162 in front of a uniformly grey wall 164 backlit by sun 166. The lighting situation causes an apparent gradient in brightness of wall 164. Scene 160 has both very bright areas, e.g., sun 166, and very dark areas, e.g., the least lit portion of wall 164, and a wide dynamic range is therefore needed to produce a natural-looking image of scene 160. In the absence of nonlinear transformation 132, a wide dynamic range image 190, generated by such a modified embodiment of system 100, would likely show visible contours on wall 164, since the limited bit depth resolution of the output of camera 110 would be insufficient in sensor signal ranges subject to greater contour visibility. However, nonlinear transformation 132 enables efficient use of the limited bit depth of the output of camera 110 to avoid, or at least minimize, contour visibility in re-linearized image 180.

In certain embodiments, processing unit 140 further includes a quantizer 144 that, after inversion of nonlinear transformation 132 by inverse transformation 142, encodes re-linearized image 180 according to a wide dynamic range encoding standard, such as "gamma" or "PQ" and the like, for example as described in ITU-R BT.2100. In one example, quantizer 144 encodes re-linearized image for subsequent decoding by a wide dynamic range display configured for low contour visibility. Quantizer 144 may be configured to code a 10,000 nits display luminance range at a bit depth in the range from 10 to 12 bits while non-linearly allocating bit depth resolution to reduce contour visibility when this "quantized" version of re-linearized image 180 is subsequently decoded and converted to display luminance by a wide dynamic range display (not shown in FIG. 1).

In an embodiment, system 100 is implemented onboard a capture device 150, such as a cellular phone.

Figure 2:
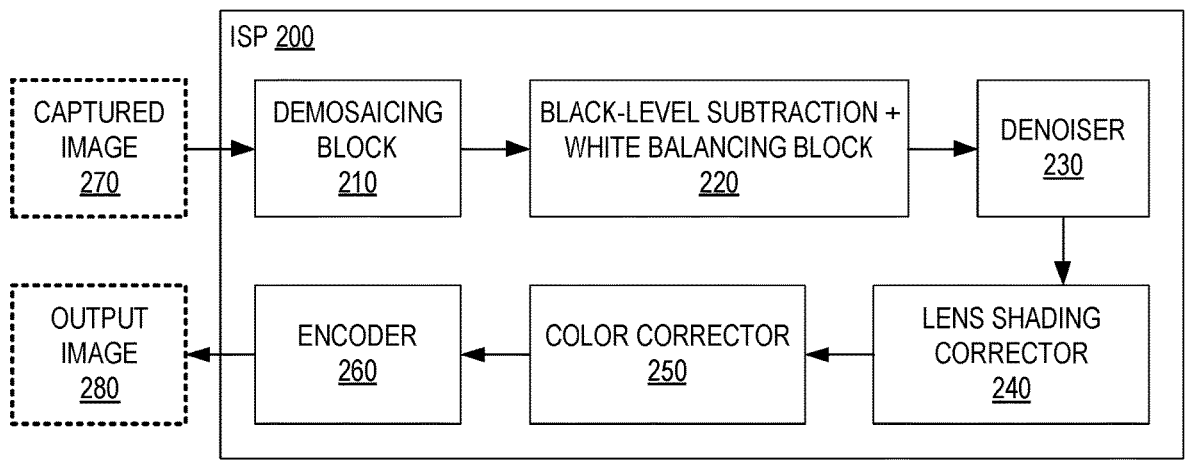
FIG. 2 shows a prior art image signal processor.

FIG. 2 shows a prior art ISP 200. ISP 200 processes a captured image 270 to produce an output image 280. ISP 200 may receive captured image 270 from an image sensor similar to image sensor 120, and output image 280 may be encoded for display on a display or for output as electronic data in a standard format. ISP 200 propagates captured image 270 through a processing pipeline that includes several different functional blocks: A demosaicing block 210 demosaics the incomplete color samples of captured image 270 to produce a full color image at the pixel resolution of captured image 270; a black-level substraction/white balancing block 220 performs background subtraction and, optionally, white balancing; a denoiser 230 reduces noise; lens shading corrector 240 corrects for lens shading causing nonuniform illumination of the image sensor generating captured image 270; a color corrector 250 corrects color; and finally a conventional encoder 260 encodes the resulting image data in output image 280.

The output of conventional encoder 260, as is typical for many off-the-shelf ISPs, is limited to a bit depth of 8 bits. Hence, conventional encoder 260 is not capable of encoding images at the bit depth resolution generally required for decoding and display on a wide dynamic range display without visible contours, at least for scenes or scene portions of relatively uniform luminance. For example, the limited bit depth of conventional encoder 260 prevents conventional encoder 260 from incorporating the functionality of quantizer 144.

Figure 3:
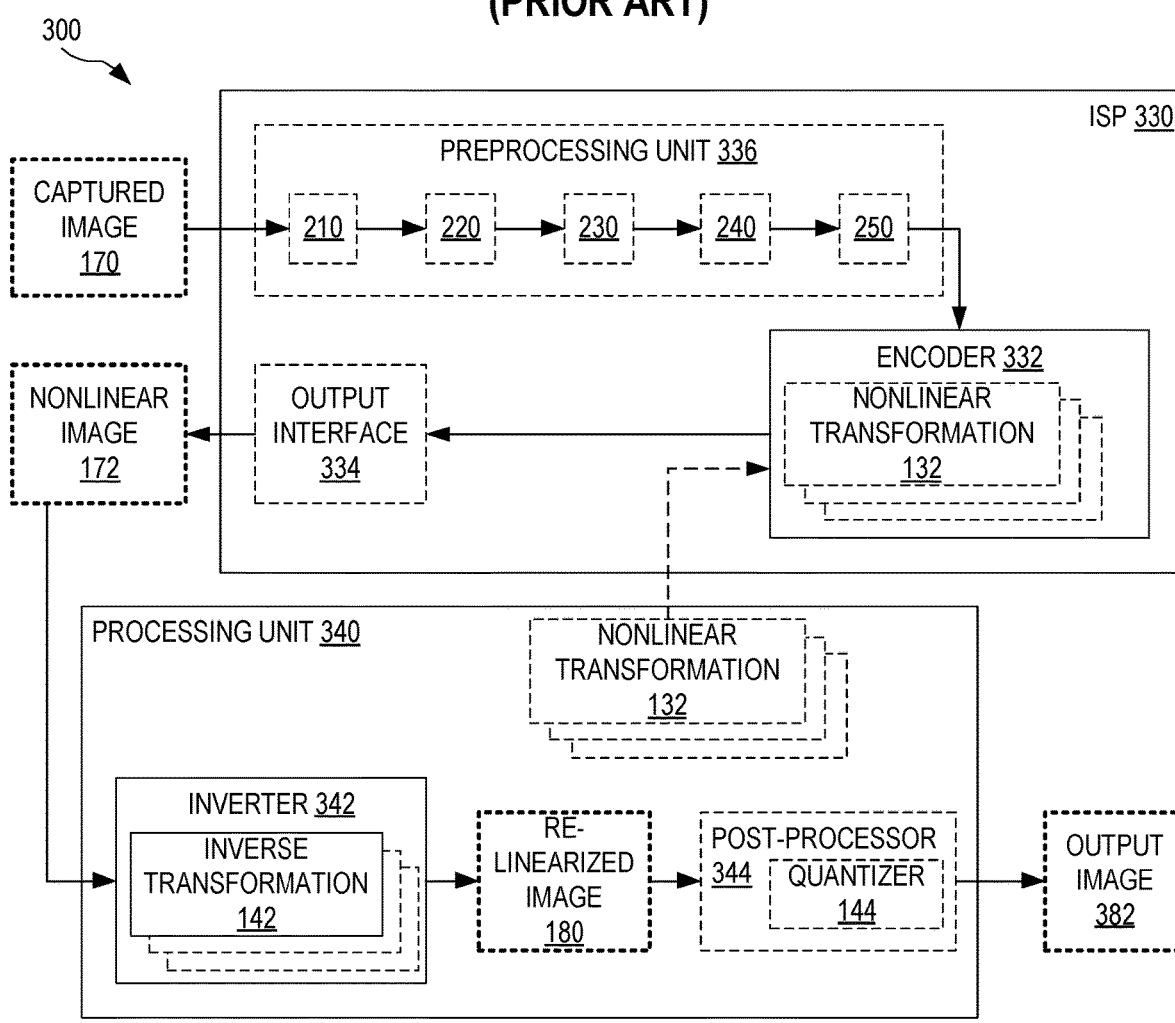
FIG. 3 illustrates a system for bit-depth efficient processing of a captured image, according to an embodiment.

FIG. 3 illustrates one example system 300 for bit-depth efficient processing of captured image 170. System 300 includes an ISP 330 and a processing unit 340, which are embodiments of ISP 130 and processing unit 140, respectively. System 300 may be coupled with image sensor 120 to form an embodiment of system 100.

ISP 330 includes an encoder 332 that applies nonlinear transformation 132 to captured image 170, as discussed above in reference to FIG. 1, to produce nonlinear image 172. In certain embodiments, ISP 330 further includes a preprocessing unit 336 that processes captured image 170 prior to application of nonlinear transformation 132 by encoder 332. Preprocessing unit 336 may include one or more of demosaicing block 210, black-level substraction/white balancing block 220, denoiser 230, lens shading corrector 240, and color corrector 250. In one embodiment, ISP 330 is a modified version of ISP 200, wherein conventional encoder 260 is replaced by encoder 332. The output of ISP 330, for example implemented as an output interface 334, is limited to the second bit depth.

Processing unit 340 includes an inverter 342 that stores inverse transformation 142 and applies inverse transformation 142 to nonlinear image 172 to produce re-linearized image 180. In certain embodiments, processing unit 340 further includes a post-processor 344 that processes re-linearized image 180 before processing unit 340 outputs the post-processed re-linearized image 180 as output image 382. Post-processor 344 may include quantizer 144 such that output image 382 is encoded for subsequent decoding by a wide dynamic range display configured for low contour visibility. Embodiments of processing unit 340 that do not include post-processor 344 may output re-linearized image 180 as output image 382.

In one embodiment, processing unit 340 stores nonlinear transformation 132 and communicates nonlinear transformation 132 to encoder 332. This embodiment of processing unit 340 may communicate nonlinear transformation 132 to encoder 332 once for subsequent use of encoder 332 on several captured images 170. In one example, processing unit 340 communicates nonlinear transformation 132 to encoder 332 during an initial setup procedure. Alternatively, this embodiment of processing unit 340 may communicate nonlinear transformation 132 to encoder 332 each time a captured image 170 is processed by encoder 332. In another embodiment, encoder 332 stores nonlinear transformation 132.

An embodiment of system 300 stores a plurality of nonlinear transformations 132 and a corresponding plurality of inverse transformations 142. Each nonlinear transformation 132 is configured for use on captured images 170 captured under a specific respective capture mode. Examples of capture modes include outdoor mode, indoor mode, portrait mode, sport mode, landscape mode, night portrait mode, and macro mode.

In one implementation, ISP 330 is configured to receive captured image 170 at a bit depth of more than 8 bits, such as 10 or 12 bits, and output nonlinear image 172 at a bit depth of 8 bits, while processing unit 340 is configured to process nonlinear image 172 and generate re-linearized image 180 and output image 382 at a bit depth of more than 8 bits, such as 10 or 12 bits.

Without departing from the scope hereof, ISP 330 may be a standalone system configured to cooperate with a processing unit 340 provided by a third party. Likewise, without departing from the scope hereof, processing unit 340 may be a standalone system configured to cooperate with an ISP 330 provided by a third party. Furthermore, inverter 342, inverse transformation(s) 142, and nonlinear transformation(s) 132 may be provided as a software product, such as a machine-readable instructions encoded in non-transitory memory, configured for implementation with a third-party processor to form an embodiment of processing unit 340.

Figure 4:
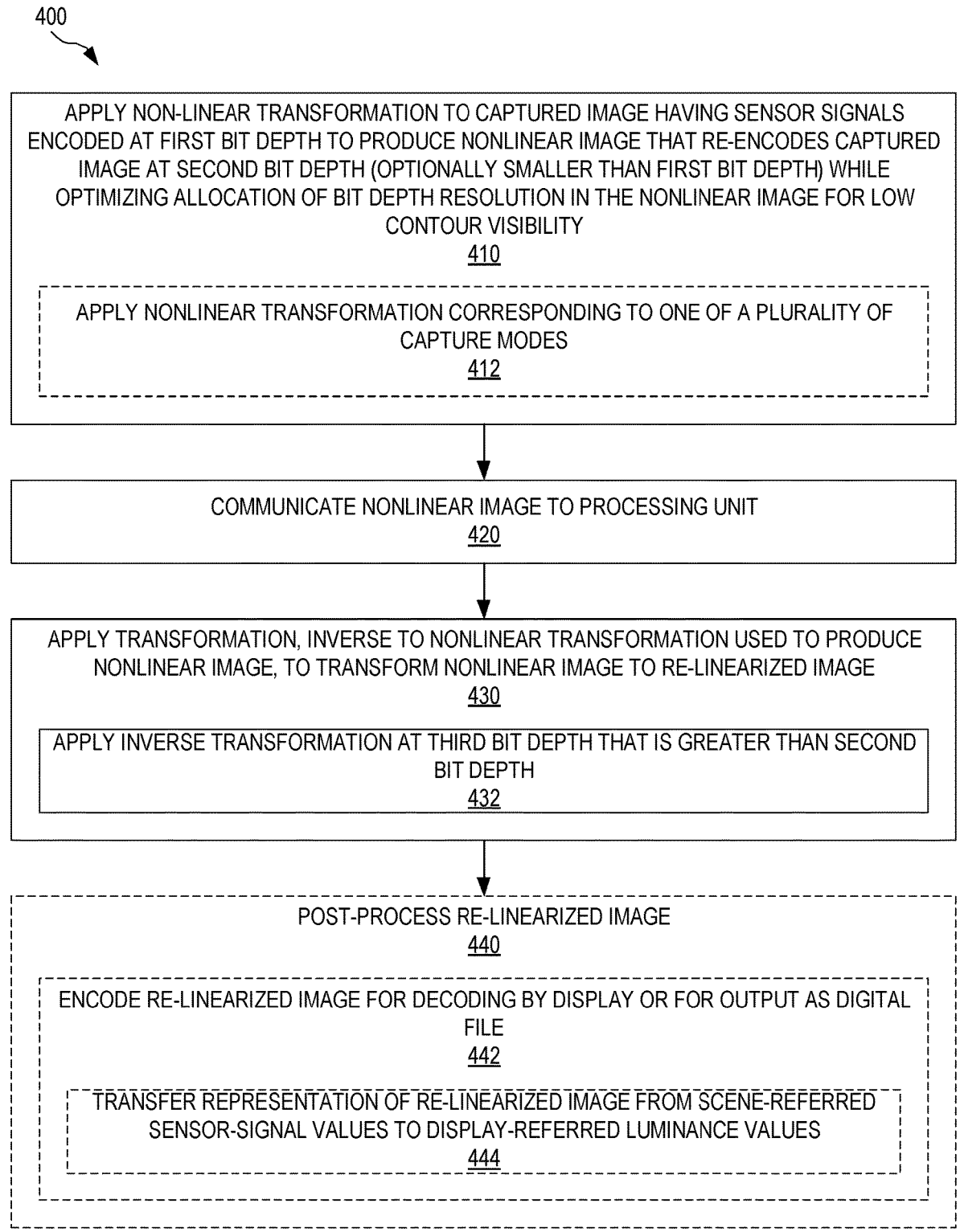
FIG. 4 illustrates a method for bit-depth efficient image processing, according to an embodiment.

FIG. 4 illustrates one example method 400 for bit-depth efficient image processing. Method 400 is performed by system 300, for example. In a step 410, method 400 applies a non-linear transformation to a captured image to produce a non-linear image. The captured image has sensor signals encoded at a first bit depth, and step 410 uses the nonlinear transformation to re-encode the image signals of the captured image in the nonlinear image at a second bit depth that may be less than the first bit depth, while optimizing allocation of bit depth resolution in the nonlinear image for low contour visibility. In one example of step 410, encoder 332 applies nonlinear transformation 132 to captured image 170, optionally preprocessed by preprocessing unit 336, to produce nonlinear image 172. Step 410 may include a step 412 of applying a nonlinear transformation that corresponds to one of a plurality of capture modes, as discussed above in reference to FIG. 3.

In a step 420, method 400 communicates the nonlinear image to a processing unit. In one example of step 420, ISP 330 communicates nonlinear image 172 to processing unit 340 via output interface 334.

In a step 430, method 400 inverts the nonlinear transformation applied in step 410. Step 430 applies, to the nonlinear image, a transformation that is inverse to the nonlinear transformation used to produce nonlinear image, so as to transform the nonlinear image to a re-linearized image. In one example of step 430, inverter 342 applies, to nonlinear image 172, an inverse transformation 142 that is inverse to a nonlinear transformation 132 applied in step 410, to produce re-linearized image 180. Step 430 includes a step 432 of applying the inverse transformation at a third bit depth that is greater than the second bit depth.

In an embodiment, method 400 further includes a step 440 that post-processes the re-linearized image. In one example of step 440, post-processor 344 processes re-linearized image 180 to produce output image 382. Step 440 may include a step 442 of encoding the re-linearized image for decoding by a display or for output as a digital file, for example according to an industry standard. In one example of step 440, quantizer 144 encodes the data of re-linearized image 180 as output image 382. Step 442 may include a step 444 of transferring representation of re-linearized image from scene-referred sensor-signal values to display-referred luminance values. In one example of step 444, quantizer 144 translates the re-linearized sensor signal values of re-linearized image 180 from a scale of code values characterizing sensor signals to a scale of code values characterizing luminance of a display on which output image 382 may be displayed. Without departing from the scope hereof, step 444 may be performed prior to the encoding of step 442.

Figure 5A:
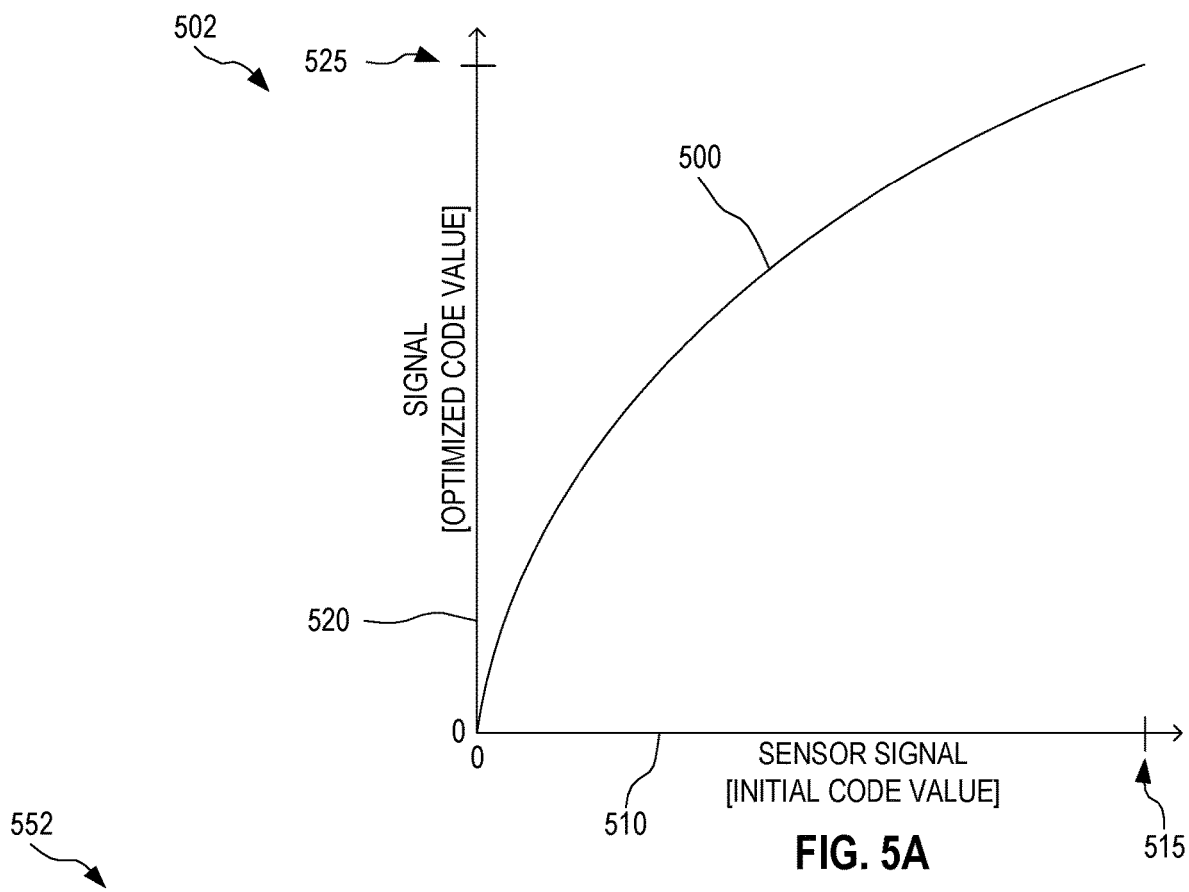
FIGS. 5A and 5B show example nonlinear and inverse transformations that may be used in the systems of FIGS. 1 and 3 and in the method of FIG. 4.
Figure 5B:
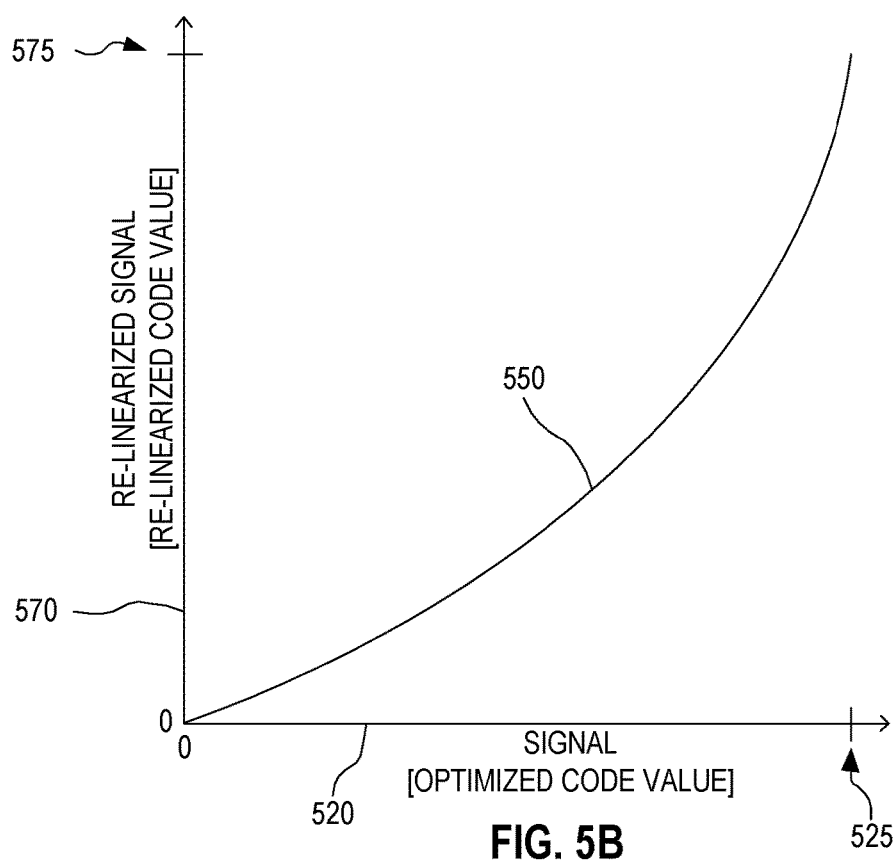

FIGS. 5A and 5B show example nonlinear and inverse transformations that may be used in systems 100 and 300 and in method 400. FIG. 5A is a plot 502 of a nonlinear transformation 500 that is an example of nonlinear transformation 132. FIG. 5B is a plot 552 of an inverse transformation 550 that is an example of inverse transformation 142. Inverse transformation 550 is the inverse transformation of nonlinear transformation 500. FIGS. 5A and 5B are best viewed together in the following description.

Nonlinear transformation 500 transforms initial code values 510 to optimized code values 520. Initial code values 510 are the integer code values that encode sensor signals, such as those of image sensor 120, in captured image 170, optionally preprocessed by preprocessing unit 336. Initial code values 510 are integer code values range from zero to a maximum code value 515 defined by the first bit depth. Optimized code values 520 range from zero to a maximum code value 525 defined by the second bit depth. Maximum code value 525 may be less than maximum code value 515. Optimized code values 550 re-encode initial code values 510, according to nonlinear transformation 500, to nonlinearly redistribute the sensor signals of captured image 170 across the second bit depth to minimize contour visibility, so as to produce nonlinear image 172.

In one example, initial code values 510 are encoded at a bit depth of 10 bits with maximum code value 515 being 1023, and optimized code values 520 are encoded at a bit depth of 8 bits with maximum code value 525 being 255.

In the example shown in FIG. 5A, nonlinear transformation 500 (a) allocates a relatively greater portion of the second bit depth (characterized by maximum code value 525) to less noisy ranges of the sensor signals of captured image 170 (characterized by maximum code value 515) and (b) allocates a relatively smaller portion of the second bit depth to more noisy ranges of the sensor signals.

Inverse transformation 550 transforms optimized code values 520 of nonlinear image 172 to re-linearized code values 570 that characterize re-linearized sensor signals at the third bit depth, so as to invert nonlinear transformation 500 and produce re-linearized image 180. Re-linearized code values 570 are integer code values that range from zero to a maximum code value 575 defined by the third bit depth. Maximum code value 575 is greater than maximum code value 525. In one example, optimized code values 520 are encoded at a bit depth of 8 bits with maximum code value 525 being 255, and re-linearized code values 570 are encoded at a bit depth of 10 bits (or 12 bits) with maximum code value 575 being 1023 (or 4095).

Figure 6:
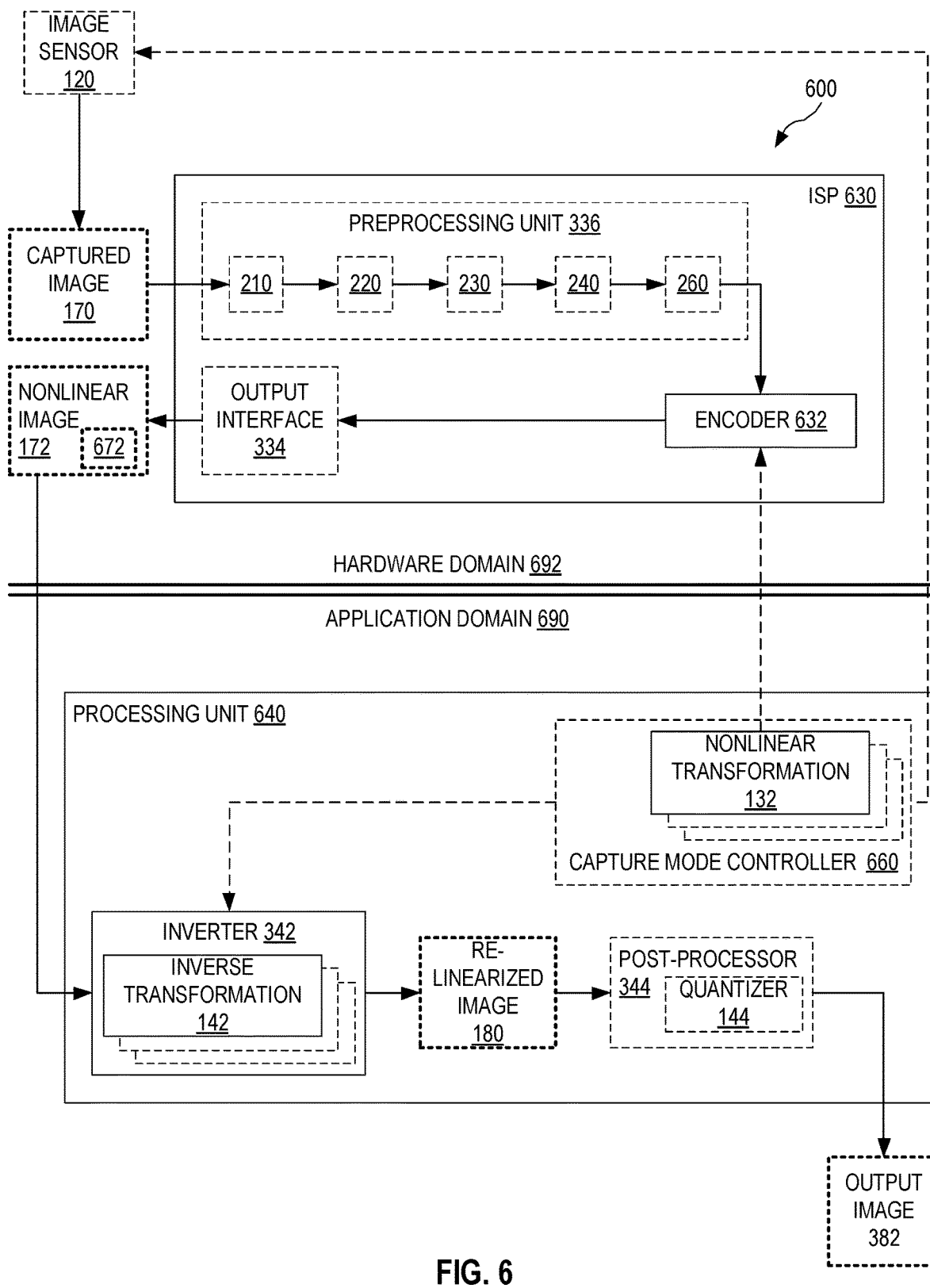
FIG. 6 illustrates a system for bit-depth efficient processing of a captured image, which is segmented in a hardware domain and an application domain, according to an embodiment.

FIG. 6 illustrates one example system 600 for bit-depth efficient processing of captured image 170, which is segmented in a hardware domain 692 and an application domain 690. System 600 is an embodiment of system 300. System 600 includes an ISP 630 and a processing unit 640, which are embodiments of ISP 330 and processing unit 340, respectively. ISP 630 is implemented in hardware domain 692, and processing unit 640 is implemented in application domain 690. System 600 is configured to receive captured image 170 from an image sensor 120 located in hardware domain 692. Without departing from the scope hereof, system 600 may include image sensor 120.

In one example scenario, system 600 is implemented onboard a cellular phone having a camera. The camera is in the hardware domain of the cellular phone and includes image sensor 120 and ISP 630. Processing unit 640 is implemented in the application domain of the cellular phone. Herein, the "application domain" of a cellular phone refers to a portion of the cellular phone capable of accommodating cellular phone applications ("apps"). For example, the application domain of the cellular phone may be open to installation of cellular phone applications provided by other parties than the manufacturer of the cellular phone.

ISP 630 includes an encoder 632 configured to receive one or more nonlinear transformations 132 from processing unit 640. Encoder 632 is an embodiment of encoder 332. ISP 630 may further include one or both of preprocessing unit 336 and output interface 334.

Processing unit 640 includes inverter 342, with one or more inverse transformations 142. Processing unit 640 may further include post-processor 344, for example including quantizer 144. Processing unit 640 stores one or more nonlinear transformations 132, and is configured to communicate nonlinear transformations 132 to encoder 632. Encoder 632 may be similar to encoder 260 except for being configured to receive one or more nonlinear transformations 132 from processing unit 640.

In operation, processing unit 640 communicates one or more nonlinear transformations 132 to encoder 632. This communication may be performed (a) once during initial configuration of encoder 632 after or during installation of inverter 342 and nonlinear transformation(s) 132 in application domain 690, or (b) in association with processing of each captured image 170 in hardware domain 692.

In certain embodiments, processing unit 640 includes a plurality of capture-mode-specific nonlinear transformations 132, each associated with a different capture mode of captured image 170. In one such embodiment, ISP 630 acts as the master. In another such embodiment, processing unit 640 acts as the master. In the embodiment with ISP 630 acting as the master, processing unit 640 communicates all capture-mode-specific nonlinear transformations 132 to encoder 632, and encoder 632 applies a particular capture-mode-specific nonlinear transformation 132 to captured image 170 according to the capture mode under which captured image 170 is captured. Nonlinear image 172 generated by encoder 632, in this embodiment, is accompanied by metadata 672 indicating (a) capture mode of captured image 170 associated with nonlinear image 172, (b) which nonlinear transformation 132 was applied by encoder 632 to produce nonlinear image 172, or (c) both capture mode of the associated captured image 170 and which nonlinear transformation 132 was used to produce nonlinear image 172. Further, in this embodiment, inverter 342 applies the appropriate inverse transformation 142 according to metadata 672. In the embodiment with processing unit 640 acting as master, processing unit 640 includes a capture mode controller 660. Capture mode controller 660 controls the capture mode of image sensor 120 (either directly, as shown in FIG. 6, or via ISP 630) and capture mode controller 660 communicates an associated capture-mode-specific nonlinear transformation 132 to encoder 632. In this embodiment, capture mode controller 660 may further be communicatively coupled with inverter 342 to control which inverse transformation 142 inverter 342 applies to nonlinear image 172. Alternatively, nonlinear image 172 may be accompanied by metadata 672, and inverter 342 applies the appropriate inverse transformation 142 according to metadata 672.

Without departing from the scope hereof, ISP 630 may be a standalone system configured to cooperate with a processing unit 640 provided by a third party. Likewise, without departing from the scope hereof, processing unit 640 may be a standalone system configured to cooperate with an ISP 630 provided by a third party. Furthermore, inverter 342, inverse transformation(s) 142, and nonlinear transformation(s) 132, optionally together with capture mode controller 660, may be provided as a software product, such as a machine-readable instructions encoded in non-transitory memory, configured for implementation with a third-party processor to form an embodiment of processing unit 640.

In one example, system 600 is implemented onboard an Android phone. In another example, system 600 is implemented on an iPhone.

Figure 7:
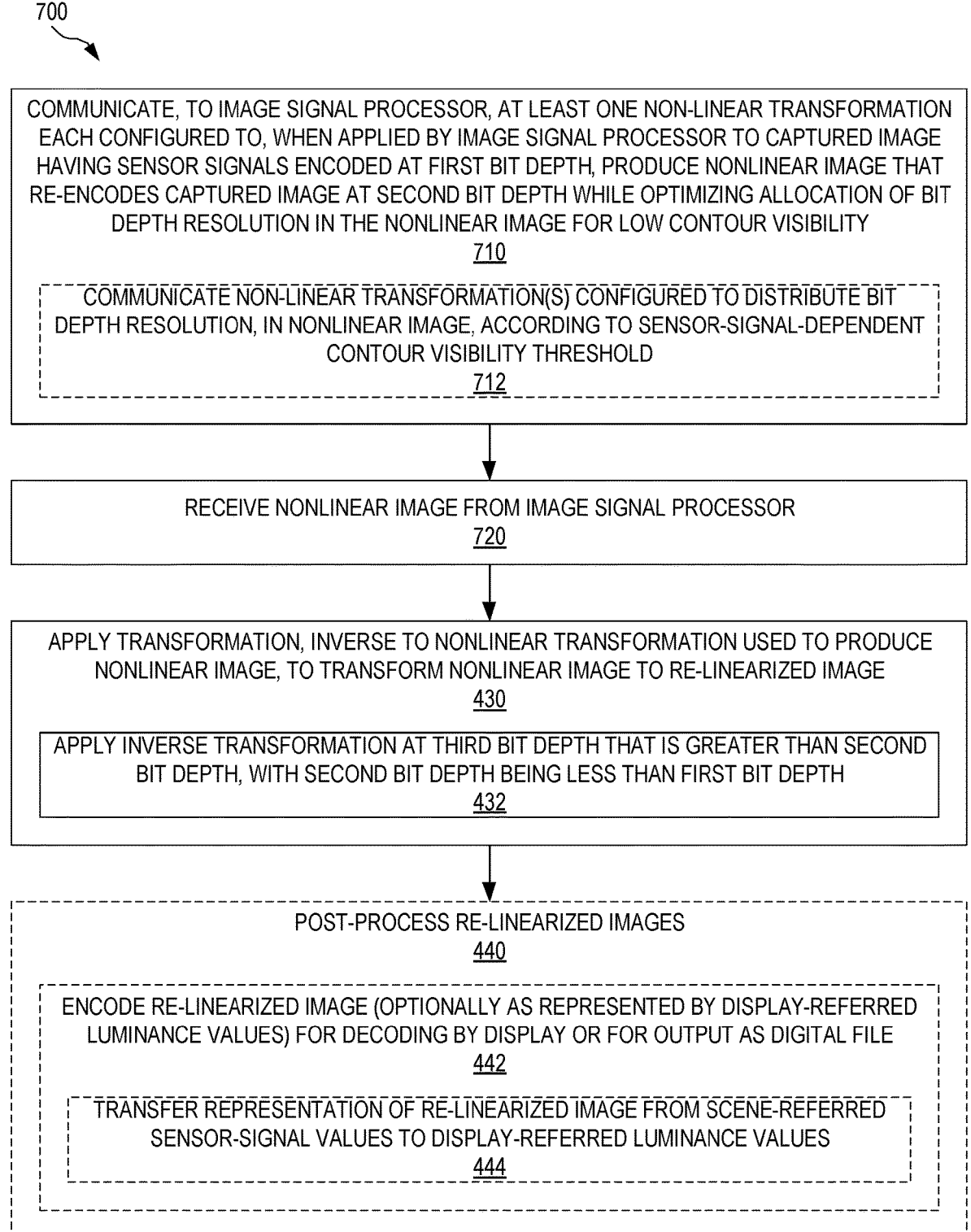
FIG. 7 illustrates a method for bit-depth efficient image processing effectuated from an application domain, such as the application domain of a cellular phone, according to an embodiment.

FIG. 7 illustrates one example method 700 for bit-depth efficient image processing effectuated from an application domain, such as the application domain of a cellular phone. Method 700 is, for example, performed by processing unit 640.

In a step 710, method 700 communicates, to an ISP, at least one non-linear transformation. Each nonlinear transformation is configured to, when applied by the ISP to a captured image having sensor signals encoded at a first bit depth, produce a nonlinear image. This nonlinear image re-encodes the captured image at a second bit depth that may be less than the first bit depth, while optimizing allocation of bit depth resolution in the nonlinear image for low contour visibility. In one example of step 710, processing unit 640 communicates at least one nonlinear transformation 132 to ISP 630.

Step 710 may include a step 712 of communicating one or more non-linear transformation configured to distribute bit depth resolution in the nonlinear image according to a sensor-signal-dependent contour visibility threshold. In one example of step 712, each nonlinear transformation 132 is configured to distribute bit depth resolution in the nonlinear image according to a sensor-signal-dependent contour visibility threshold. The sensor-signal-dependent contour visibility threshold defines, for each sensor signal level, the lowest sensor signal contrast that is visible in the presence of noise. As discussed above in reference to FIG. 1, the noise may be the native noise of the image sensor used to capture the image to which the nonlinear transformation is applied (e.g., image sensor 120), or the noise may include both the native noise of the image sensor and noise introduced by with other processing of the captured image prior to application of the nonlinear transformation. As also discussed above in reference to FIG. 1, noise tends to reduce contour visibility such that more noisy ranges of sensor signals have a higher contour visibility threshold than less noisy ranges of sensor signals. The nonlinear transformation(s) of step 712 may therefore distributes less noisy ranges of the sensor signals of a captured image (e.g., captured image 170) over a relatively greater portion of the second bit depth than more noisy ranges of the sensor signals.

In a step 720, method 700 receives a nonlinear image from the ISP, which is generated by the ISP by applying a nonlinear transformation, communicated to the ISP in step 710, to an image captured by an image sensor. In one example of step 720, processing unit 640 receives nonlinear image 172 from ISP 630, wherein nonlinear image 172 has been generated by ISP 630 at least through application of nonlinear transformation 132 by encoder 632.

After step 720, method 700 proceeds to perform step 430 of method 400. In one example of steps 430 and 440, as implemented in method 700, processing unit 640 performs step 430 using inverter 342 of processing unit 640. Method 700 may further include step 440 of method 400, for example performed by post-processor 344 of processing unit 640.

FIG. 8 illustrates one example method 800 for bit-depth efficient image processing effectuated from an application domain, such as the application domain of a cellular phone, which utilizes capture-mode-specific nonlinear transformations. Method 800 is, for example, performed by processing unit 640.

In a step 810, method 800 communicates a plurality of capture-mode-specific non-linear transformations to an ISP. Each capture-mode-specific non-linear transformation is configured to, when applied by the ISP to a captured image having sensor signals encoded at first bit depth, produce a nonlinear image that re-encodes the captured image at a second bit depth that may be less than the first bit depth, while optimizing allocation of bit depth resolution in the nonlinear image for low contour visibility. In one example of step 810, processing unit 640 communicates a plurality of capture-mode-specific nonlinear transformations 132 to encoder 632 of ISP 630.

Step 810 may include a step 812 of communicating capture-mode-specific non-linear transformations configured to distribute bit depth resolution, in nonlinear image, according to sensor-signal-dependent contour visibility threshold. Step 812 is similar to step 712 but pertaining to the capture-mode-specific non-linear transformations.

In a step 820, method 800 receives a nonlinear image and a corresponding capture-mode specification from the ISP. In one example of step 820, processing unit 640 receives nonlinear image 172 and associated metadata 672 indicating the capture mode associated with nonlinear image 172 (or, alternatively, indicating which capture-mode-specific nonlinear transformation 132 was used to produce nonlinear image 172).

In a step 830, method 800 inverts the nonlinear transformation used to produce the nonlinear image received in step 820. Step 830 applies, to the nonlinear image, a capture-mode-specific inverse transformation that is inverse to the capture-mode-specific nonlinear transformation used to produce nonlinear image, so as to transform the nonlinear image to a re-linearized image. Step 830 selects the appropriate capture-mode-specific inverse transformation based upon the capture-mode specification received along with the nonlinear image in step 820. In one example of step 830, inverter 342 of processing unit 640 selects a capture-mode-specific inverse transformation 142 based upon metadata 672 and applies this capture-mode-specific inverse transformation 142 to nonlinear image 172, so as to produce re-linearized image 180. Step 830 includes step 432 of applying the inverse transformation at a third bit depth that is greater than the second bit depth.

Method 800 may further include step 440 of method 400, for example performed by post-processor 344 of processing unit 640.

FIG. 9 illustrates one example method 900 for bit-depth efficient image processing effectuated from an application domain, such as the application domain of a cellular phone, which controls the capture mode and utilizes capture-mode-specific nonlinear transformations. Method 900 is, for example, performed by an embodiment of processing unit 640 that includes capture mode controller 660.

In a step 910, method 900 communicates, to a camera, (a) specification of a capture mode to be used by an image sensor of the camera to capture an image having sensor signals encoded at first bit depth and (b) an associated capture-mode-specific non-linear transformation configured. The capture-mode-specific non-linear transformation is configured to, when applied by an image signal processor of the camera to the captured image, produce a nonlinear image that re-encodes the captured image at a second bit depth that may be less than the first bit depth, while optimizing allocation of bit depth resolution in the nonlinear image for low contour visibility. In one example of step 910, capture mode controller 660 communicates specification of a capture mode to image sensor 120, either directly or via ISP 630. In this example, capture mode controller 660 also communicates a corresponding capture-mode-specific nonlinear transformation 132 to encoder 632 of ISP 630.

Step 910 may include a step 912 of communicate a capture-mode-specific non-linear transformation that is configured to distribute bit depth resolution, in the nonlinear image, according to a sensor-signal-dependent contour visibility threshold. Step 912 is similar to step 812 except for communicating only a single capture-mode-specific non-linear transformation.

Next, method 900 performs step 720 of method 700 and step 830 of method 800. In one example of step 830, as implemented in method 900, inverter 342 receives the capture mode specification from capture mode controller 660. In another example of step 830, as implemented in method 900, inverter 342 receives the capture mode specification from ISP 630 via metadata 672.

Method 900 may further include step 440 of method 400, for example performed by post-processor 344 of processing unit 640.

Figure 10:
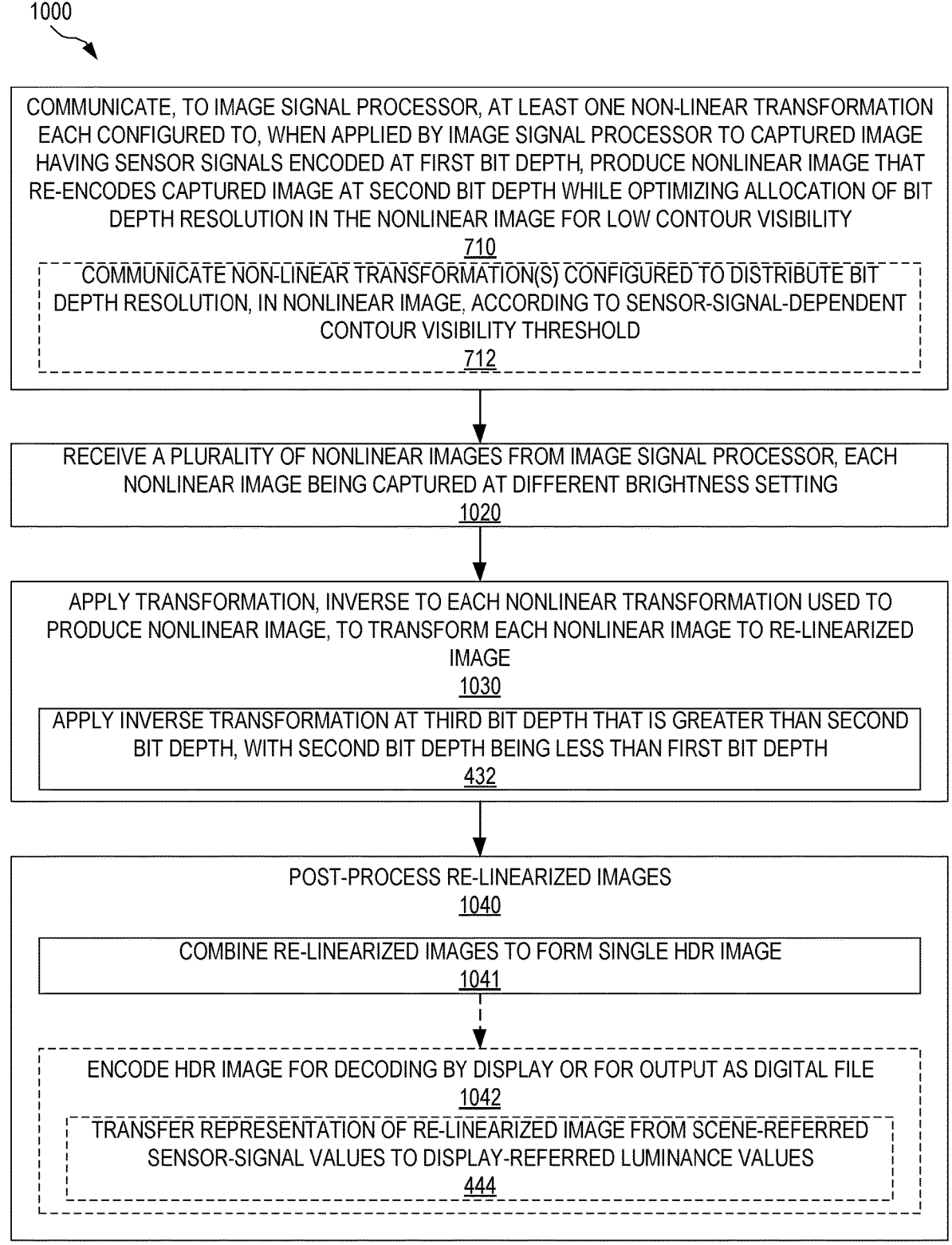
FIG. 10 illustrates a method for bit-depth efficient image processing effectuated from an application domain, such as the application domain of a cellular phone, which generates a high-dynamic-range image, according to an embodiment.

FIG. 10 illustrates one example method 1000 for bit-depth efficient image processing effectuated from an application domain, such as the application domain of a cellular phone, which generates a high-dynamic-range (HDR) image. Method 1000 is, for example, performed by processing unit 640.

Method 1000 initially performs step 710, as discussed above in reference to FIG. 7. Next, method 1000 performs a step 1020 of receiving a plurality of nonlinear images from the ISP, wherein each nonlinear image has been captured at different brightness setting. In one example of step 1020, processing unit 640 receives a plurality of nonlinear images 172 from ISP 630, wherein each nonlinear image 172 has been captured under a different brightness setting.

In a step 1030, method 1000 applies, to each nonlinear image received in step 1020, an inverse transformation that is inverse to the nonlinear transformation used to produce the nonlinear image, so as to transform each nonlinear image to a respective re-linearized image. In one example of step 1030, inverter 342 applies an inverse transformation 142 to each nonlinear image 172 to produce a respective re-linearized image 180. For each nonlinear image, step 1030 includes step 432 of applying the inverse transformation at a third bit depth that is greater than the second bit depth.

In a step 1040, method 1000 post-processes the re-linearized images. In one example of step 1040, post-processor 344 of processing unit 640 processes re-linearized images 180 generated by inverter 342 in step 1030. Step 1040 includes a step 1041 of combining the re-linearized images to form a single HDR image that has greater dynamic range than any one of the individual captured images. Step 1040 may utilize HDR image combination algorithms known in the art. Step 1040 may further include a step 1042 of encoding the HDR image for decoding by a display or for output as a digital file. Step 1042 is similar to step 442, apart from being applied to the HDR image. Step 1042 may include or be preceded by step 444.

Without departing from the scope hereof, method 1000 may further utilize capture-mode-specific nonlinear transformations, as discussed above in reference to FIGS. 8 and 9.

Figure 11:
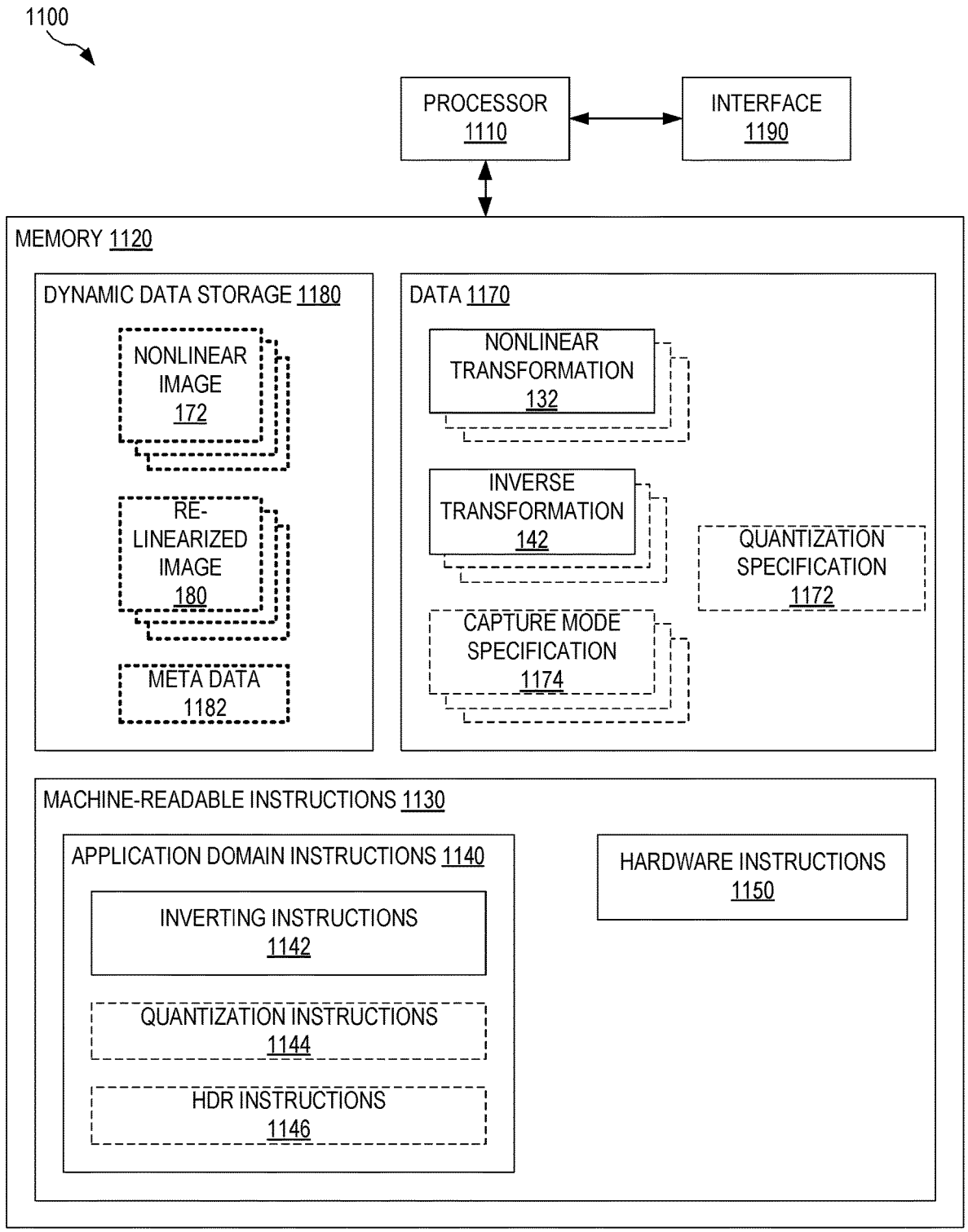
FIG. 11 illustrates a computer for bit-depth efficient image processing, according to an embodiment.

FIG. 11 illustrates one example computer 1100 for bit-depth efficient image processing. Computer 1100 is an embodiment of processing unit 340 or processing unit 640. Computer 1100 may perform any one of methods 700, 800, 900, and 1000. In one example scenario, computer 1100 is implemented in the application domain of a cellular phone.

Computer 1100 includes a processor 1110, a non-transitory memory 1120, and an interface 1190. Processor 1110 is communicatively coupled with each of memory 1120 and interface 1190. Memory 1120 includes machine-readable instructions 1130, data 1170, and dynamic data storage 1180. Machine-readable instructions 1130 include application domain instructions 1140 which, in turn, include inverting instructions 1142. Application domain instructions 1140 may further include quantization instructions 1144 and/or HDR instructions 1146. In addition, application domain instructions 1140 include hardware instructions 1150. Data 1170 includes one or more nonlinear transformations 132 and corresponding inverse transformations 142. Data 1170 may further include a quantization specification 1172 and/or a plurality of capture mode specifications 1174.

Upon execution by processor 1110, hardware instructions 1150 retrieve one or more nonlinear transformations 132 from data 1170 and output nonlinear transformation(s) 132 to an ISP via interface 1190. Hardware instructions 1150 may be further configured to, upon execution by processor 1110, retrieve one of capture mode specifications 1174 from data 1170 and output this capture mode specification 1174 to an image sensor or ISP via interface 1190.

Upon execution by processor 1110, inverting instructions 1142 receive a nonlinear image 172 via interface 1190, retrieve an inverse transformation 142 from data 1170, and applies inverse transformation 142 to nonlinear image 172 to produce re-linearized image 180. Inverting instructions 1142 may store nonlinear image 172 and/or re-linearized image 180 to dynamic data storage 1180. Processor 1110 and inverting instructions 1142 cooperate to form an embodiment of inverter 342.

Upon execution by processor 1110, quantization instructions 1144 retrieve re-linearized image 180 from dynamic data storage 1180, retrieve quantization specification 1172 from data 1170, re-encodes re-linearized image 180 in output image 382 according to quantization specification 1172, and outputs output image 382 via interface 1190 (or, alternatively, stores output image 382 to dynamic data storage 1180). Processor 1110 and quantization instructions 1144 cooperate to form an embodiment of quantizer 144 as implemented in post-processor 344.

Upon execution by processor 1110, HDR instructions 1146 retrieve a plurality of re-linearized images 180 from dynamic data storage 1180 and combines these re-linearized images 180 to produce a HDR image. HDR instructions 1146 may be configured to output the HDR image via interface 1190, or store the HDR image to dynamic data storage 1180 for further processing by processor 1110, for example according to quantization instructions 1144. Processor 1110 and HDR instructions 1146 cooperate to form an embodiment of post-processor 344 configured to perform step 1041 of method 1000.

Without departing from the scope hereof, machine-readable instructions 1130 and data 1170 may be provided as a stand-alone software product configured for implementation on a third-party computer that has (a) a non-transitory memory for storage of machine-readable instructions 1130 and data 1170 and (b) a processor for execution of machine-readable instructions 1130.

Figure 12:
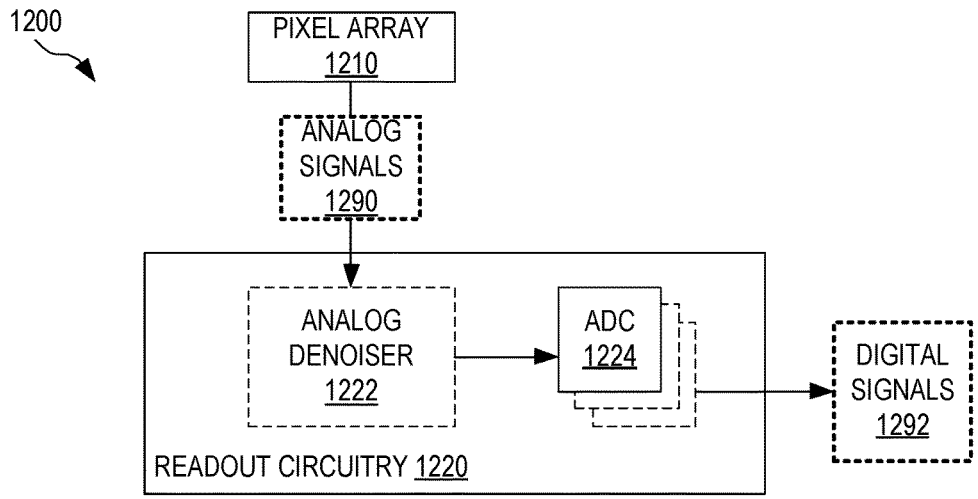
FIG. 12 shows a prior-art image sensor.

FIG. 12 shows a prior-art image sensor 1200. Image sensor 1200 includes a pixel array 1210 having a plurality of photosensitive pixels (for clarity of illustration individual pixels are not shown in FIG. 12. Each pixel generates an analog electrical signal 1290 in response to incident light. Image sensor 1200 further includes readout circuitry 1220 for reading out analog signals 1290 from pixel array 1210. Readout circuitry 1220 includes at least one analog-to-digital converter (ADC) 1224 that converts analog signals 1290 to respective digital signals 1292. The bit depth of digital signals 1292 is that same as the bit depth of each ADC 1224. For example, if image sensor 1200 is intended to output digital signals at a bit depth of 10 bits, the bit depth of each ADC 1224 must be 10 bits.

The power consumed by each ADC 1224 is a function of the bit depth of ADC 1224, wherein greater bit depth requires more power. Generally, the power consumption is approximately proportional to $\Delta f \cdot 2^b$, wherein $\Delta f$ is the spectral bandwidth and b is the bit depth. In a use scenario example, image sensor 1200 is integrated in a cellular phone and generally relies on a battery for power. In this scenario, a 10 bit ADC 1224, for example, would drain the battery faster than an 8 bit ADC 1224. In other words, there is a tradeoff between bit depth and battery life. In addition, the cost of ADC 1224 increases with bit depth.

Image sensor 1200 may further include an analog denoiser 1222 that reduces noise of analog signals 1290 prior to analog-to-digital conversion by ADC(s) 1224.

Figure 13:
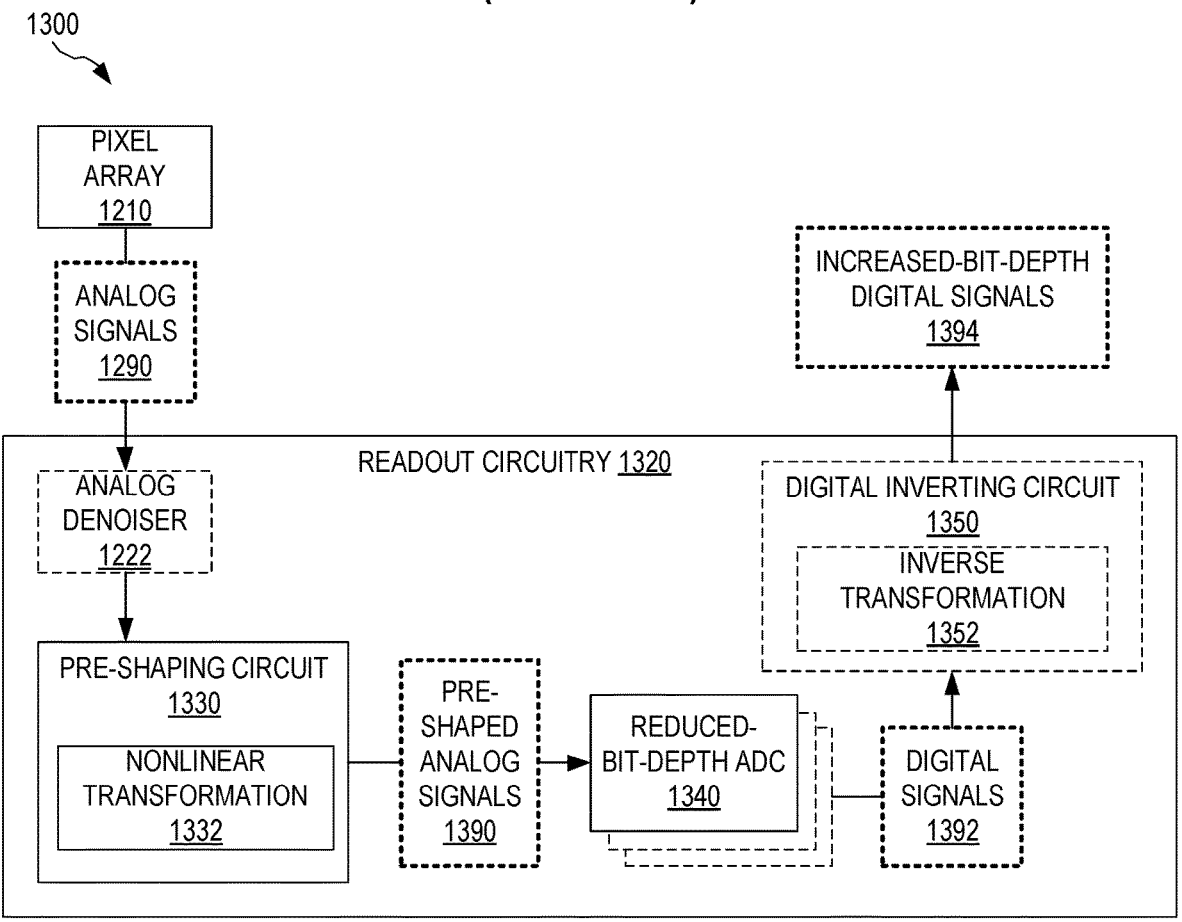
FIG. 13 illustrates an image sensor with bit-depth efficient analog-to-digital image conversion, according to an embodiment.

FIG. 13 illustrates one example image sensor 1300 with bit-depth efficient analog-to-digital image conversion. Image sensor 1300 optimizes allocation of bit depth resolution of one or more ADCs to output digital image signals at a greater bit depth than the bit depth of the ADC(s). Image sensor 1300 may, but need not, be implemented in system 100 as image sensor 120.

Image sensor 1300 includes pixel array 1210 and readout circuitry 1320. Readout circuitry 1320 includes a pre-shaping circuit 1330, at least one reduced-bit-depth ADC 1340 having a first bit depth, and a digital inverting circuit 1350. Pre-shaping circuit 1330 is an analog circuit that includes a nonlinear transformation 1332, and digital inverting circuit 1350 includes an inverse transformation 1352 that is inverse to nonlinear transformation 1332. In certain embodiments, readout circuitry 1320 further includes analog denoiser 1222. Pre-shaping circuit 1330 may implement nonlinear transformation 1332 as one or more gamma and/or logarithmic functions, or other analog function blocks known in the art.

In one embodiment, image sensor 1300 further includes a digital inverting circuit 1350 containing an inverse transformation 1352 that is inverse to nonlinear transformation 1332. Digital inverting circuit 1350 may implement inverse transformation 1352 as a look-up table. In another embodiment, digital inverting circuit 1350 is implemented onboard an ISP communicatively coupled with image sensor 1300, such as ISP 330 or ISP 200.

In operation, pixel array 1210 generates analog signals 1290. Pre-shaping circuit 1330 applies nonlinear transformation 1332 to analog signals 1290 (optionally after noise reduction by analog denoiser 1222) to produce pre-shaped analog signals 1390. Reduced-bit-depth ADC 1340 converts pre-shaped analog signals 1390 to digital signals 1392 at the bit depth of reduced-bit-depth ADC 1340. Digital inverting circuit 1350 applies inverse transformation 1352 to digital signals 1392 to invert the nonlinear transformation applied by pre-shaping circuit 1330 to generate increased-bit-depth digital signals 1394 having a second bit depth. The second bit depth is greater than the first bit depth. In one example, the first bit depth is 8 bits and the second bit depth is 10 bits.

Nonlinear transformation 1332 facilitates efficient use of the limited bit depth resolution of reduced-bit-depth ADC 1340. Nonlinear transformation 1332 redistributes the levels of analog signals 1290 to optimize the allocation of bit depth resolution by reduced-bit-depth ADC 1340 for low contour visibility in captured images encoded in increased-bit-depth digital signals 1394. The functional form of nonlinear transformation 1332 may be similar to the functional form of nonlinear transformation 132. For example, since noise tends to reduce contour visibility, one embodiment of nonlinear transformation 1332 distributes less noisy ranges of analog signals 1290 (optionally accounting for noise reduction by analog denoiser 1222) over a relatively greater portion of the first bit depth than more noisy ranges of analog signals 1290. In other words, this embodiment of nonlinear transformation 1332 (a) allocates a relatively greater portion of the first bit depth to less noisy ranges of analog signals 1290 and (b) allocates a relatively smaller portion of the first bit depth to more noisy ranges of analog signals 1290. Since greater analog signals 1290 generally are noisier than smaller analog signals 1290, nonlinear transformation 1332 may allocate a relatively greater portion (e.g., 20%) of the first bit depth to the lower range of analog signals 1290 (e.g., the lowest 10% of analog signals 1290).

As compared to a version of prior art image sensor 1200 configured to generate digital signals 1292 at the second bit depth, image sensor 1300 may achieve the same bit depth with minimal or no adverse effect on contour visibility while operating with an ADC of lower bit depth than ADC 1224. Consequently, by virtue of nonlinear transformation 1332, image sensor 1300 may achieve image quality comparable to that of prior art image sensor 1200 at lower cost and with lower power consumption than prior art image sensor 1200. Image sensor 1300 may reduce power consumption by as much as a factor of four compared to the existing state of the art linear ADC implementation. Embodiments of image sensor 1300 that do not include digital inverting circuit 1350, but instead are configured to be communicatively coupled with an ISP containing digital inverting circuit, may further facilitate an increased frame rate since the image data output by image sensor 1300 in the form of digital signals 1392 are at a lower bit depth than digital signals 1292.

In one embodiment, readout circuitry 1320 includes a reduced-bit-depth ADC 1340 for each pixel of pixel array 1210. This embodiment of readout circuitry 1320 may also be configured with a pre-shaping circuit 1330 and, optionally, a digital inverting circuit 1350 for each pixel of pixel array 1210. In another embodiment, readout circuitry 1320 includes fewer reduced-bit-depth ADCs 1340 than there are pixels in pixel array 1210. This embodiment of readout circuitry 1320 uses multiplexing such that each reduced-bit-depth ADC 1340 sequentially reads analog signals 1290 from different pixels of pixel array 1210. This embodiment of readout circuitry 1320 may similarly multiplex the processing of analog signals 1290 by pre-shaping circuit 1330 and, optionally, digital inverting circuit 1350.

Figure 14A:
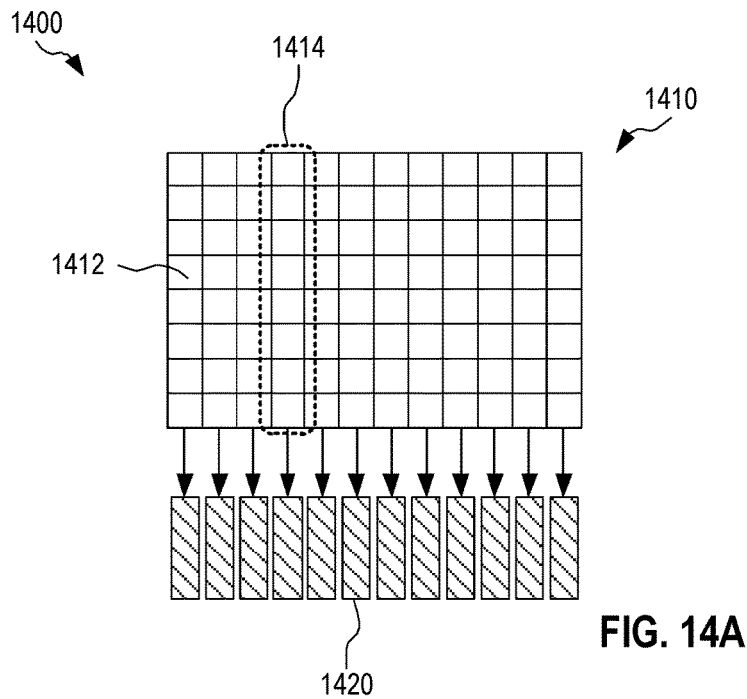
FIGS. 14A and 14B illustrate an image sensor with bit-depth efficient analog-to-digital conversion in column-specific readout circuitry, according to an embodiment.
Figure 14B:
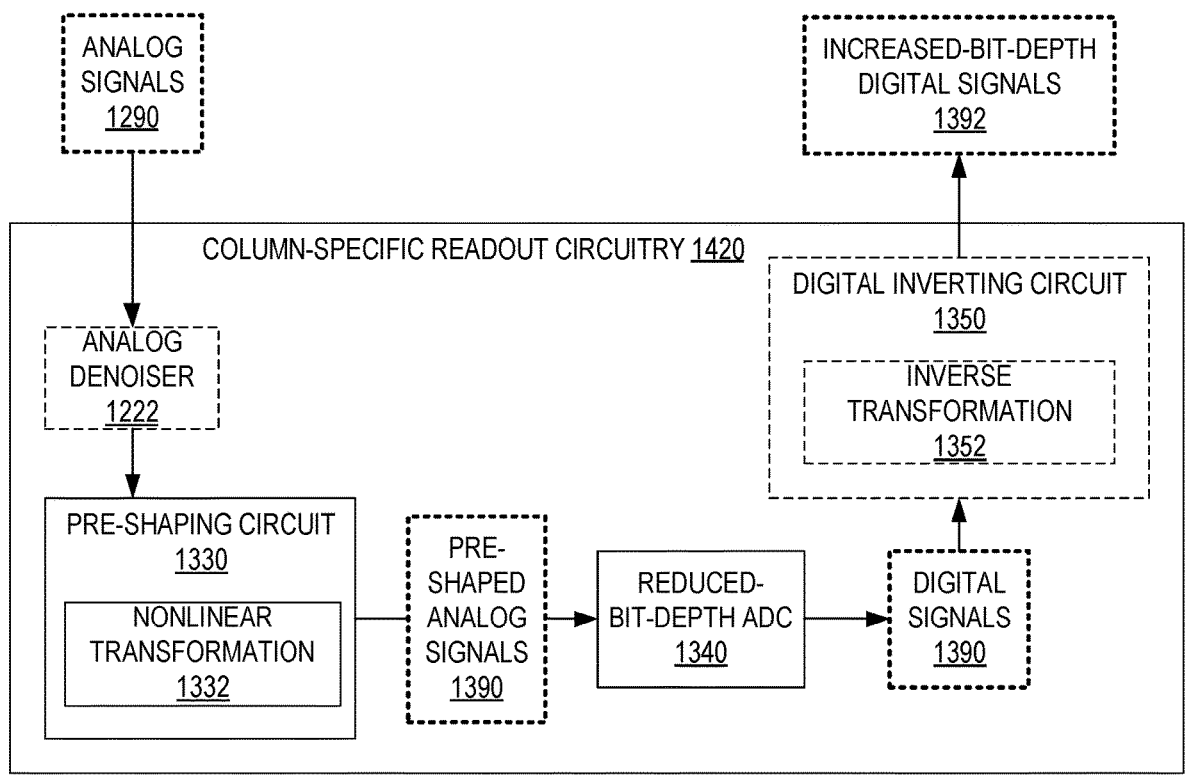

FIGS. 14A and 14B illustrate one example image sensor 1400 with bit-depth efficient analog-to-digital conversion in column-specific readout circuitry. Each pixel column of image sensor 1400 has associated column-specific readout circuitry that optimizes allocation of bit depth resolution of an ADC to output digital image signals at a greater bit depth than the bit depth of the ADC. Image sensor 1400 is an embodiment of image sensor 1300. FIG. 14A shows a schematic top plan view of image sensor 1400. FIG. 14B is a block diagram of one instance of column-specific readout circuitry 1420. FIGS. 14A and 14B are best viewed together in the following description.

Image sensor 1400 includes a pixel array 1410 having a plurality of pixels 1412 arranged in columns 1414. For clarity of illustration, not all pixels 1412 and not all columns 1414 are labeled in FIG. 14A. Each column 1414 is communicatively coupled with respective column-specific readout circuitry 1420 that sequentially reads out analog signals 1290 of each pixel 1412 in column 1414. Each instance of column-specific readout circuitry 1420 includes pre-shaping circuit 1330 and a single reduced-bit-depth ADC 1340, communicatively coupled as discussed above in reference to FIG. 13. Each instance of column-specific readout circuitry 1420 may further include digital inverting circuit 1350.

It is understood that column-specific readout circuitry 1420 may have some column-to-column differences. For example, to account for column-to-column variation in pixels 1412 and associated circuitry, nonlinear transformation 1332 may be calibrated on a column-specific basis.

Figure 15:
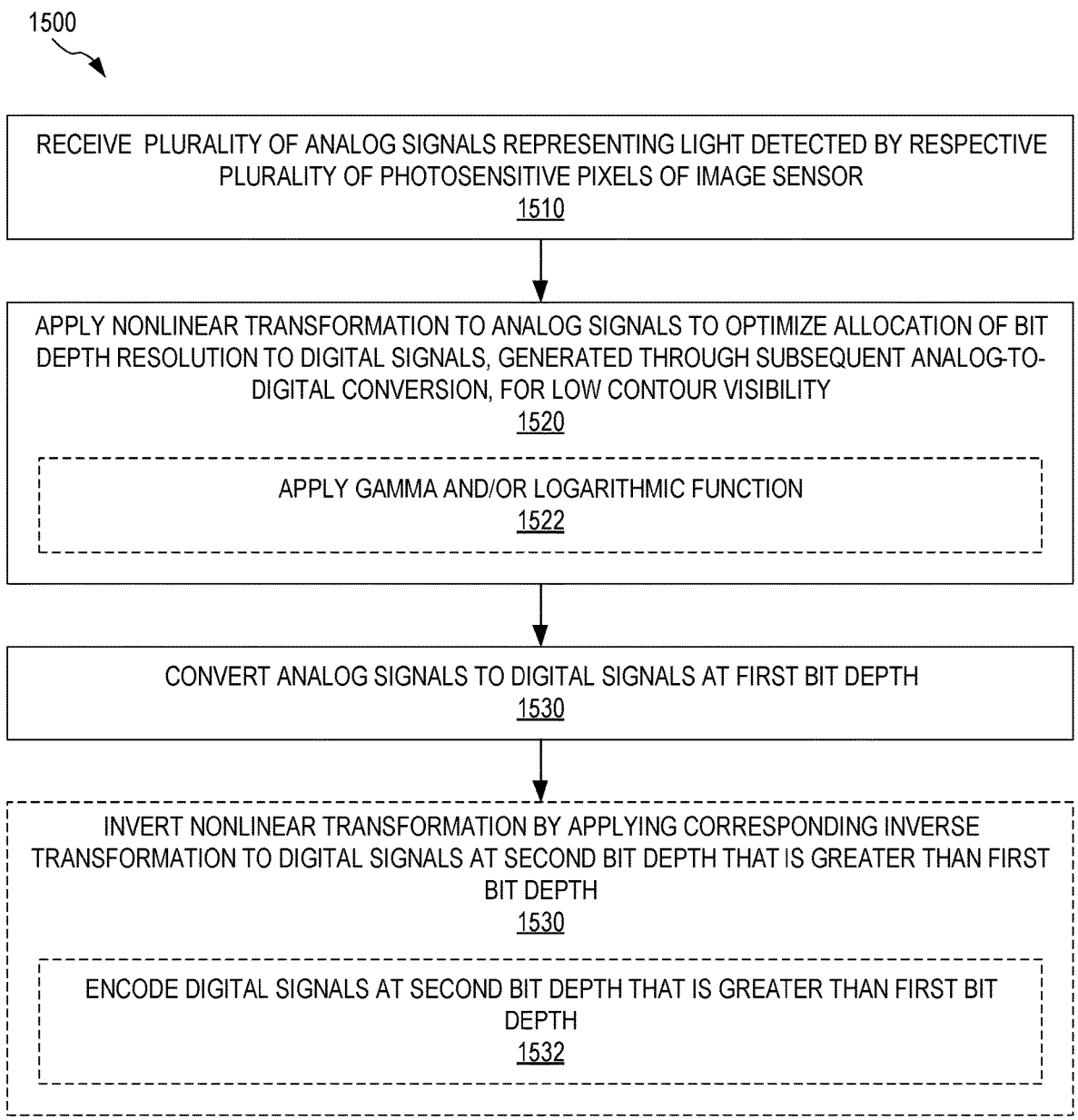
FIG. 15 illustrates a method for bit-depth efficient analog-to-digital conversion in an image sensor, according to an embodiment.

FIG. 15 illustrates one example method 1500 for bit-depth efficient analog-to-digital conversion in an image sensor. Method 1500 may be performed by image sensor 1300 or image sensor 1400.

In a step 1510, method 1500 receives a plurality of analog signals representing light detected by a respective plurality of photosensitive pixels of an image sensor. In one example of step 1510, readout circuitry 1320 receives analog signals 1290 from pixel array 1210. In another example of step 1510, each instance of column-specific readout circuitry 1420 of image sensor 1400 receives analog signals 1290 from a corresponding column 1414 of pixels 1412.

In a step 1520, method 1500 applies a nonlinear transformation to the analog signals to optimize the allocation of bit depth resolution to digital signals, generated through subsequent analog-to-digital conversion, for low contour visibility. In one example of step 1520, pre-shaping circuit 1330 of readout circuitry 1320 applies nonlinear transformation 1332 to each analog signal 1290 received from pixel array 1210. In another example of step 1520, pre-shaping circuit 1330 of each instance of column-specific readout circuitry 1420 of image sensor 1400 applies nonlinear transformation 1332 to each analog signal 1290 received from a corresponding column 1414 of pixel array 1410. Step 1520 may include a step 1522 of applying one or more gamma and/or logarithmic functions. In one example of step 1520, pre-shaping circuit 1330 propagates each analog signal 1290 through one or more analog circuits that each applies a gamma or a logarithmic function.

In a step 1530, method 1500 converts the pre-shaped analog signals, generated in step 1520, to digital signals at a first bit depth. In one example of step 1530, each reduced-bit-depth ADC 1340 of either readout circuitry 1320 or of column-specific readout circuitry 1420 converts a pre-shaped analog signal 1390 to a corresponding digital signal 1392.

In certain embodiments, method 1500 further includes a step 1540 of inverting the nonlinear transformation of step 1520 by applying a corresponding inverse transformation to the digital signals at a second bit depth that is generally greater than the first bit depth. In one example of step 1540, digital inverting circuit 1350 of readout circuitry 1320, or of an ISP communicatively coupled with readout circuitry 1320, applies inverse transformation 1352 to each digital signal 1392 received from reduced-bit-depth ADC 1340. In another example of step 1540, digital inverting circuit 1350 of each instance of column-specific readout circuitry 1420, or a digital inverting circuit 1350 communicatively coupled with each instance of column-specific readout circuitry 1420, applies inverse transformation 1352 to each digital signal 1392 received from reduced-bit-depth ADC 1340.

Example I: Determination of Nonlinear Transformation Applied by ISP Encoder

FIGS. 16-24B illustrate an example of determination of nonlinear transformation 132.

Figure 16:
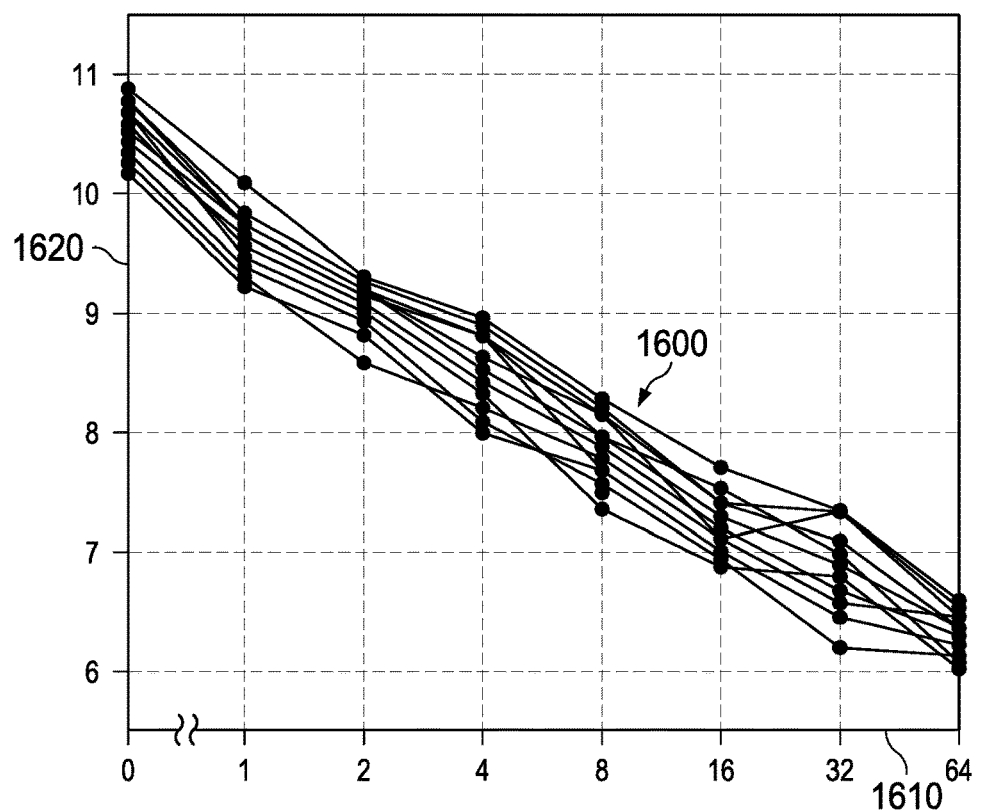
FIG. 16 shows an example of required bit depth as a function of noise level.

FIG. 16 shows the results of a study where a cohort of observers were presented with a set of images each having a shallow brightness gradient. The images sampled three parameters: bit depth at which the image is encoded, the average image luminance, and a level of Gaussian noise added to shallow brightness gradient. For each average luminance and each noise level, the observers were asked to select the minimum bit depth required to avoid visible contours in the images. FIG. 16 shows a group of curves 1600. Each curve 1600 is associated with a specific respective average luminance and indicates the required bit depth 1620 as a function of the Gaussian noise level 1610, wherein the Gaussian noise level is indicated as standard deviation in 12 bit code values. It is evident from FIG. 16 that the required bit depth is approximately inversely proportional to the Gaussian noise level and mostly independent of the average luminance.

Captured image 170 may include noise from a variety of sources. At low sensor signal levels, the noise may be dominated by signal-independent contributions such as dark current, readout noise, and Johnson noise. At greater sensor signal levels, the noise is generally dominated by photon shot noise. Photon shot noise originates from the discrete nature of light that translates to electronic sensor signals through photoelectric generation in photodiode wells of image sensor 120. Shot noise is signal-dependent, such that the shot noise standard deviation is proportional to the square root of the sensor signal.

Figure 17:
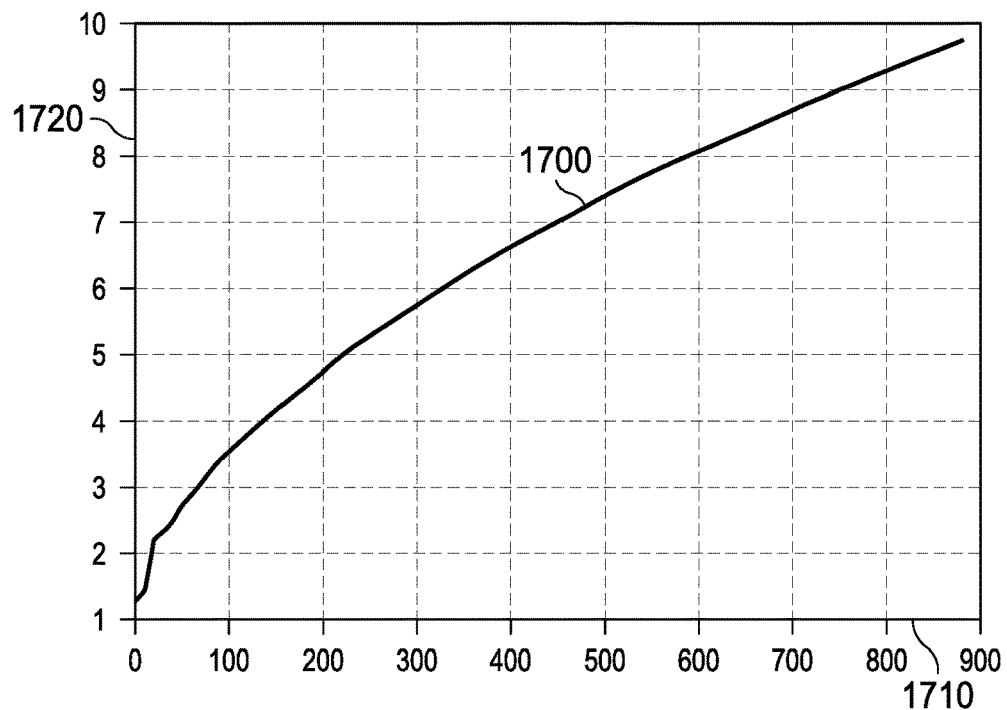
FIG. 17 shows a noise characterization of the Google Pixel camera.

FIG. 17 shows a curve 1700 plotting noise standard deviation 1720 as a function of digital number 1710 (code value level of the sensor signal), measured for the image sensor of the Google Pixel camera at 1 msec exposure time. The square root dependence at the higher code levels shows that the noise at greater sensor signals is dominated by shot noise. Most image sensors exhibit the same general behavior as indicated in FIG. 17.

Figure 18:
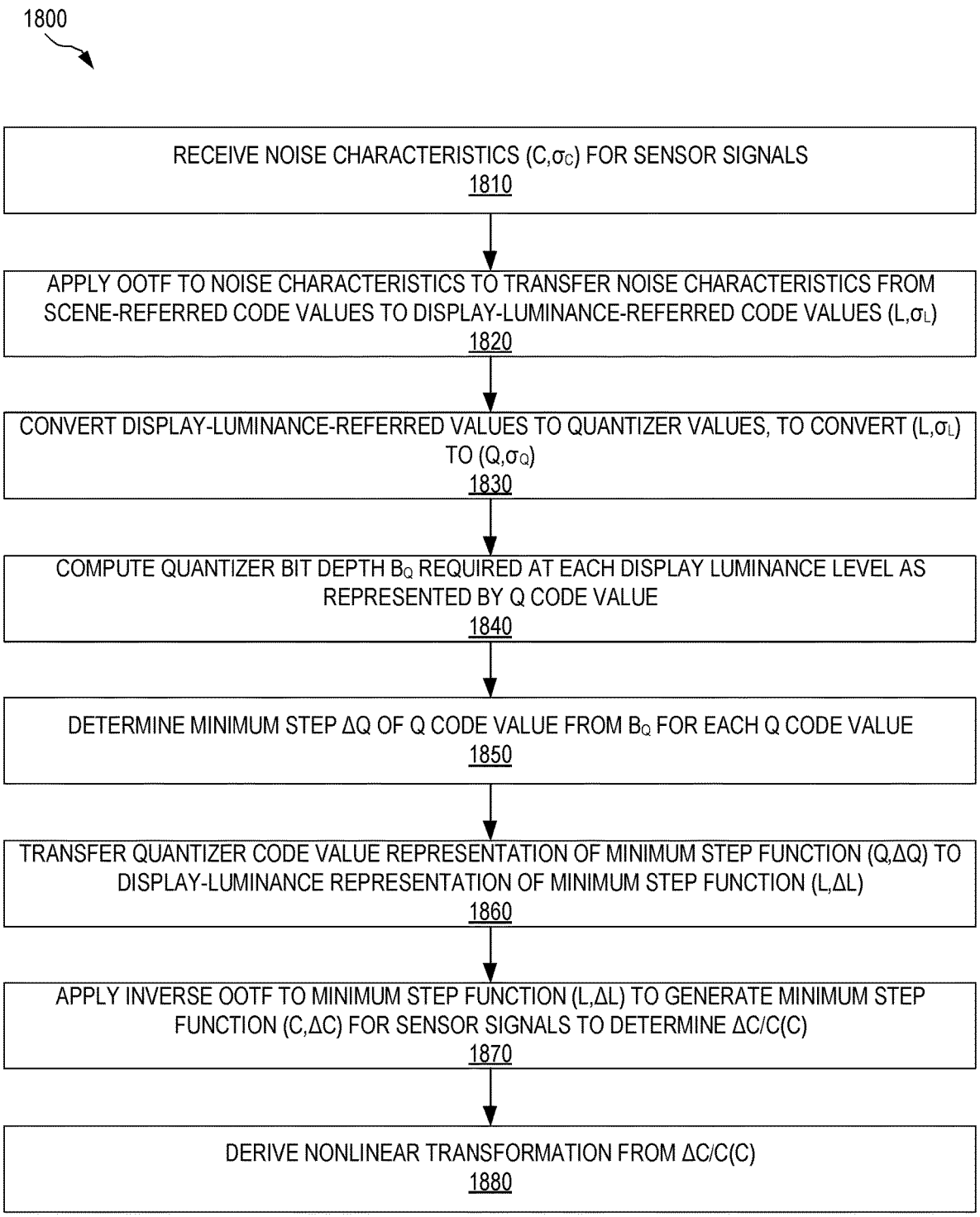
FIG. 18 illustrates a method for determining the nonlinear transformation of the system of FIG. 1 for an image sensor 120, according to an embodiment.

FIG. 18 illustrates one example method 1800 for determining nonlinear transformation 132 for an image sensor 120. Method 1800 is a calibration procedure that may be performed for any given embodiment of image sensor 120. In one scenario, method 1800 is performed for a single image sensor 120, or a few copies of the same type of image sensor 120, and the resulting nonlinear transformation 132 is then universally applicable to all instances of this same type of image sensor 120. Method 1800 may be performed by a computer.

It is understood that the nonlinear transformation 132 determined by method 1800 may be capture-mode specific. Thus, for image sensors 120 capable of image capture under a plurality of capture modes, method 1800 may be performed for each of the capture modes.

In a step 1810, method 1800 receives noise characteristics for sensor signals of image sensor 120 as encoded in captured image 170. The noise characteristics characterize the standard deviation ac (or other equivalent statistical measure) of the sensor signal as a function of code value C. In one embodiment, ac pertains only to the native noise of image sensor 120. In another embodiment, ac further accounts for noise contributions/reductions from preprocessing unit 336. Curve 1700 of FIG. 17 is an example of $(C, \sigma_C)$ pertaining to native noise only.

In a step 1820, method 1800 applies an optical-to-optical transfer function (OOTF) to the noise characteristics $(C, \sigma_C)$ received in step 1810. The OOTF transfers the noise characteristics from scene-referred code values $(C, \sigma_C)$ to display-luminance-referred code values $(L, \sigma_L)$. In one embodiment, the OOTF applied in step 1820 is the same function applied in step 444 of method 400.

In a step 1830, method 1800 converts the noise characteristics from display-luminance-referred code values $(L, \sigma_L)$ to corresponding quantizer code values $(Q, \sigma_Q)$ according to a desired encoding performed by quantizer 144. Steps 1820 and 1830 cooperate to propagate the noise characteristics of captured image 170 to resulting noise characteristics of output image 382.

In a step 1840, method 1800 computes the quantizer bit depth $B_Q$ required at each display luminance level as represented by the quantizer code value Q in presence of noise $\sigma_Q$. Step 1840 may utilize the functional form of the curves shown in FIG. 16 to compute $B_Q$ from $(Q, \sigma_Q)$.

In a step 1850, method 1800 determines, based upon $B_Q$, the minimum step ΔQ of the quantizer code value Q for each Q value Minimum step ΔQ indicates the minimum step in quantizer code value Q associated with a visible (step-like) contrast. For steps smaller than minimum step ΔQ, contrast is not visible.

In a step 1860, method 1800 transfers the quantizer code value representation (Q,ΔQ) of the minimum step function to a display-luminance-referred minimum step function (L,ΔL). Step 1860 determines (L,ΔL) from (Q,ΔQ) by applying a function that is inverse to the function applied in step 1830.

In a step 1870, method 1800 applies the inverse OOTF to minimum step function (L,ΔL) to generate a minimum step function (C,ΔC) for sensor signals, so as to determine a minimum contrast curve ΔC/C(C). The minimum contrast curve ΔC/C(C) characterizes a sensor-signal-dependent contour visibility threshold, such as the sensor-signal-dependent contour visibility threshold of step 712.

In a step 1880, method 1800 derives nonlinear transformation 132 from minimum contrast curve ΔC/C(C). In one embodiment, step 1880 parametrizes nonlinear transformation 132, and determines the parameters of nonlinear transformation 132 by fitting the relative quantization induced by nonlinear transformation 132, at the bit depth of nonlinear transformation 132 (such as 8 bits), to minimum contrast curve ΔC/C(C).

Figure 19:
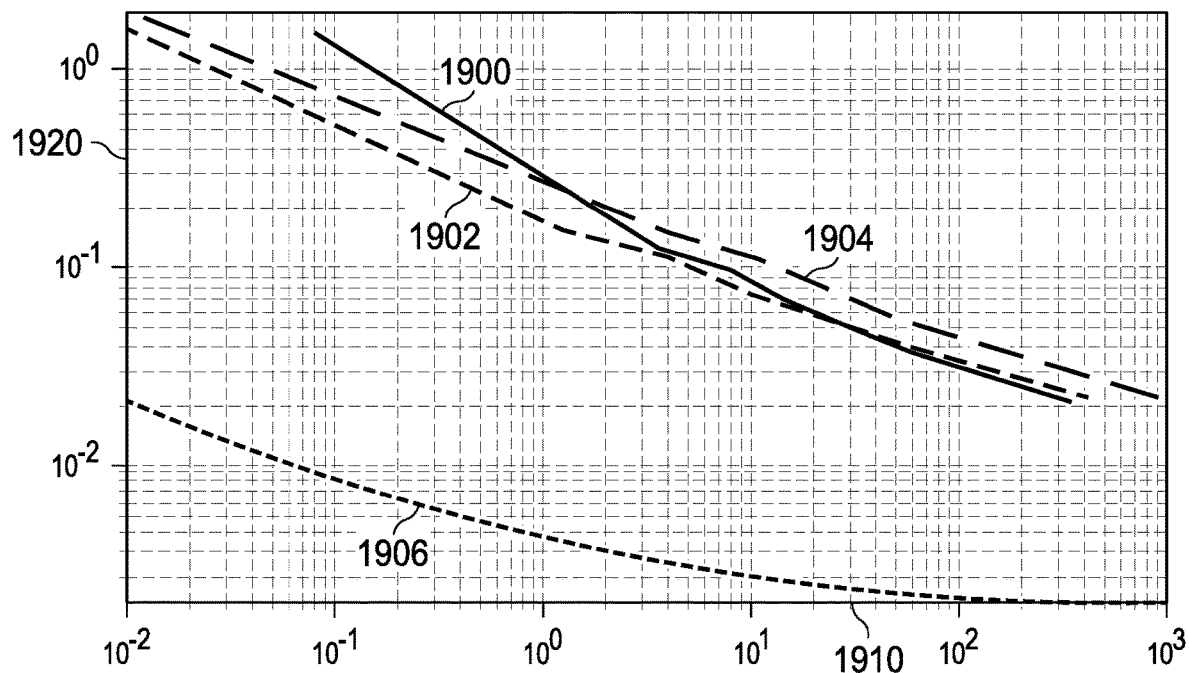
FIG. 19 shows minimum contrast curves derived from an example of method 1800 based upon the Google Pixel camera noise.

FIG. 19 shows several minimum contrast curves 1900, 1902, and 1904 derived from an example of method 1800 based upon the Google Pixel camera noise characteristics of FIG. 17. Each of curves 1900, 1902, and 1904 is associated with application of a different OOTF in step 1820 and using the Dolby Perceptual Quantizer (ITU-R Recommendation BT.2100) in step 1830. Each minimum contrast curve 1900, 1902, and 1904 is derived from the minimum step function (L,ΔL) determined in an example of step 1860 and indicates ΔL/L (1920) as a function of L (1910). These ΔL/L(L) curves depend somewhat on the OOTF chosen. FIG. 19 also shows the 12 bit Dolby Perceptual Quantizer curve 1906, which resides just below the visibility threshold in the absence of noise. Comparing curve 1906 to the curves 1900, 1902, and 1904 demonstrates the degree to which noise can substantially reduce the sensitivity to contrast, in this case almost two orders of magnitude.

Figure 20:
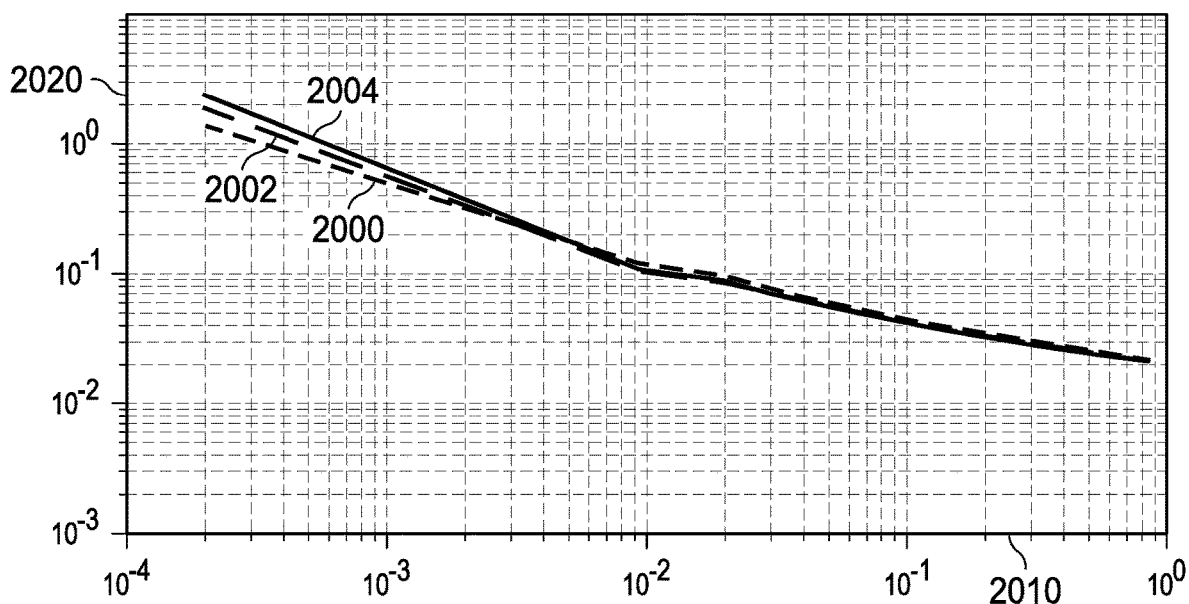
FIG. 20 shows an example result of mapping the minimum contrast curves of FIG. 19 back to sensor signal code values.

FIG. 20 shows the result of mapping minimum contrast curves 1900, 1902, and 1904 back to sensor signal code values through the inverse OOTF, as done in an example of step 1870. FIG. 20 shows curves 2000, 2002, and 2004 each indicating ΔC/C (2020) as a function of C (2010). Curves 2000, 2002, and 2004 are derived from curves 1900, 1902, and 1904, respectively. As can be seen from FIG. 20, the minimum contrast curves ΔC/C(C) represented in sensor-signal space show very similar behavior despite the use of very different OOTFs in each case. This may be understood in the following way. Using an OOTF with higher contrast will stretch contours that would make them more visible in noise-free imagery. However, the camera noise will also induce more masking through this OOTF, thus increasing the ΔL/L minimum contrast, providing further visual masking to the contours.

The ΔC/C(C) curves shown in FIG. 20 were derived using the native sensor noise characteristics. In another example, method 1800 further takes into account noise reduction performed by preprocessing unit 336, for example by denoiser 230.

Figure 21:
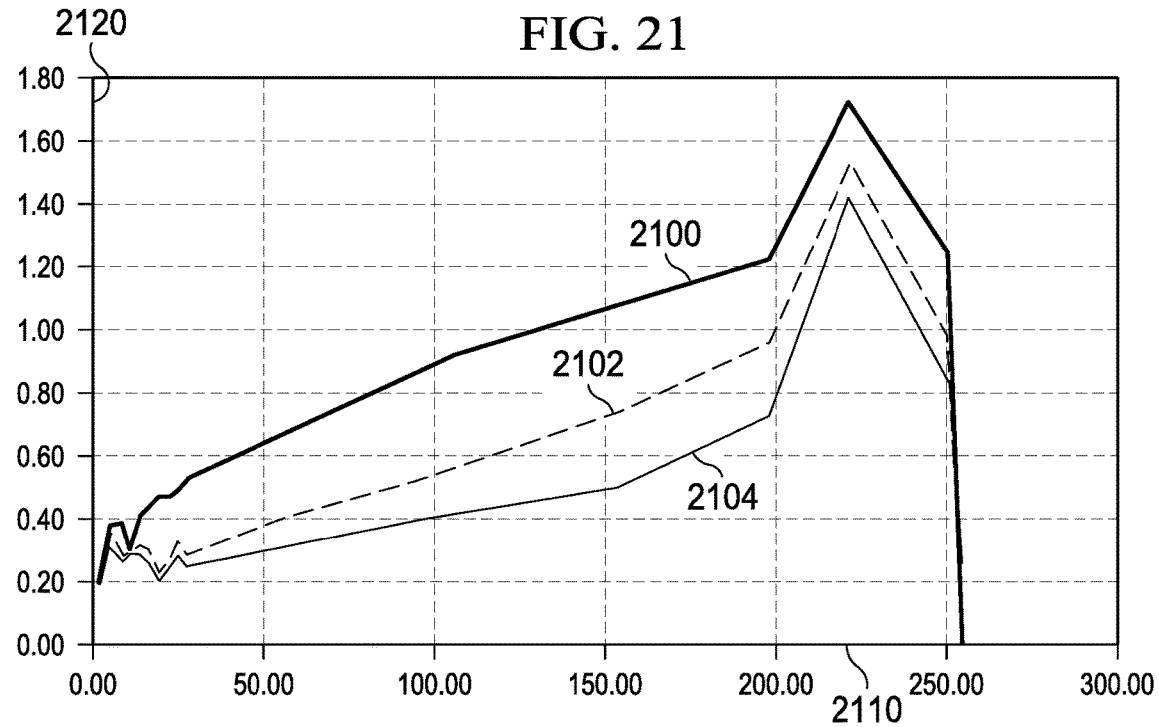
FIG. 21 shows an example of typical noise reduction from an image signal processor.

FIG. 21 shows an example of typical noise reduction from an ISP. FIG. 21 shows three curves 2100, 2102, and 2104 indicating noise 2120 as a function of digital code value 2110 at a bit depth of 8 bits. Curve 2100 indicates the noise without noise reduction, curve 2102 indicates the noise level in the presence of temporal denoising, and curve 2104 indicates the noise level in the presence of temporal and wavelet denoising. It is clear, in this case, that the ISP can reduce the native sensor noise levels by a factor of 2-3×. This noise reduction will then have the effect of reducing the ΔL/L minimum contrasts and their ΔC/C counterparts.

Figure 22:
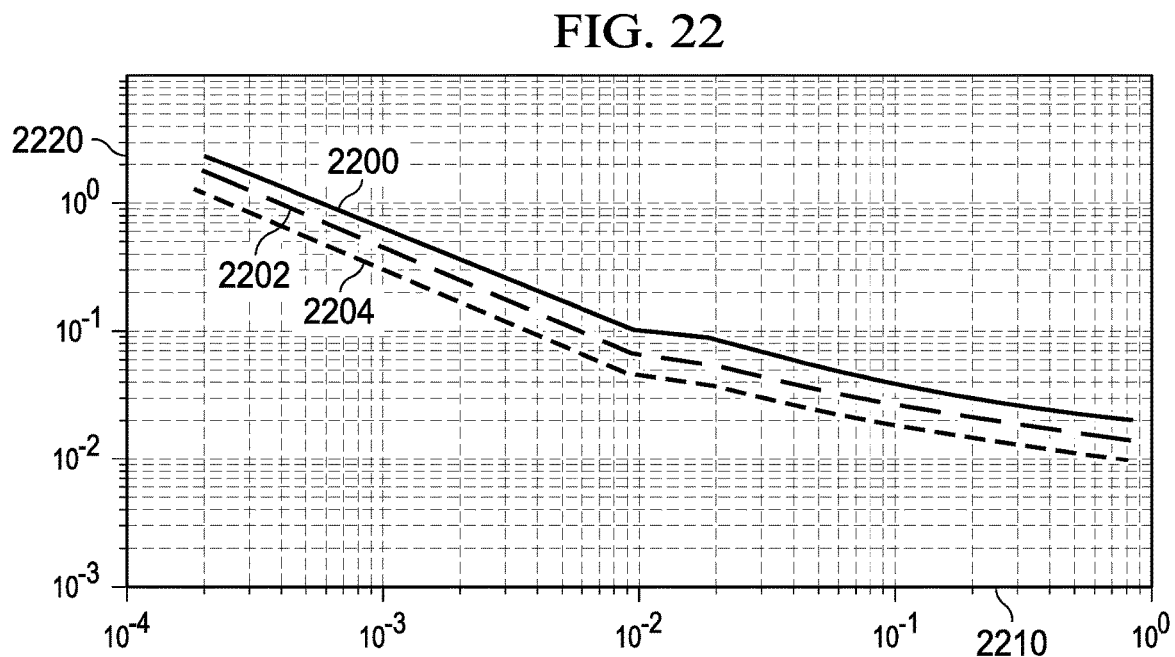
FIG. 22 illustrates, by example, the effect of denoising on minimum contrast curves.

FIG. 22 illustrates the effect of denoising on minimum contrast curves ΔC/C(C). FIG. 22 shows minimum contrast curves 2200, 2202, and 2204 indicating ΔC/C (2220) as a function of C (2210). Curve 2200 corresponds to no denoising, that is, assuming the native noise of the image sensor. Curve 2202 corresponds to a 2× noise reduction, and curve 2204 corresponds to a 4× noise reduction. Denoising has the effect of pushing the minimum contrast curves downward, which indicates a greater sensitivity to contours caused by limited bit depth resolution.

Figure 23:
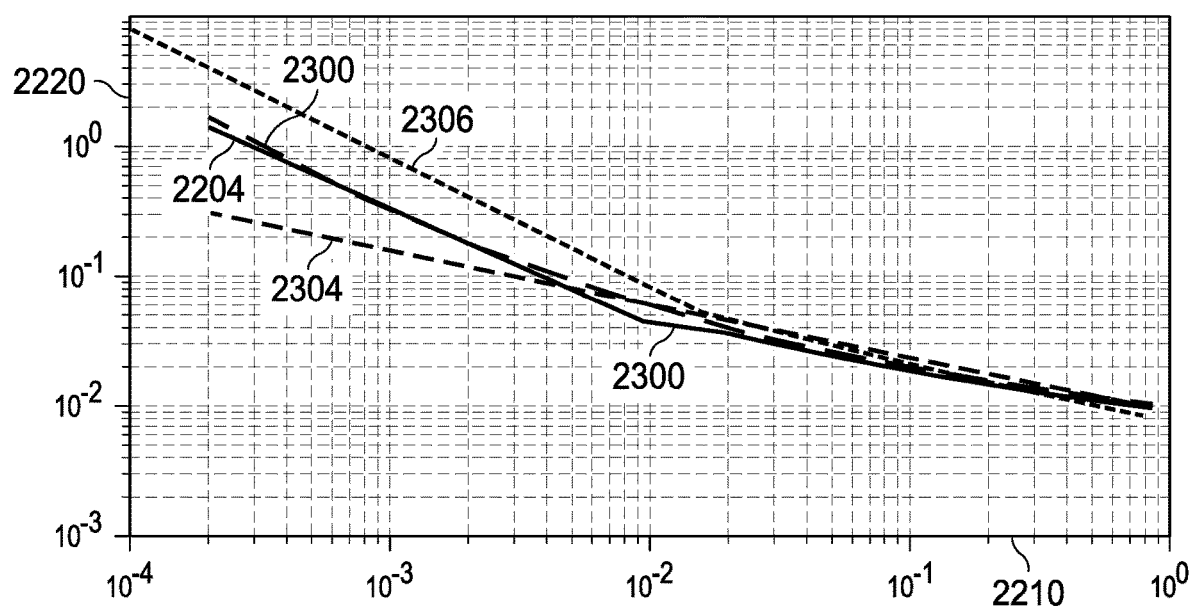
FIG. 23 illustrates an example of deriving the parameters of a nonlinear transformation from a minimum contrast curve.

FIG. 23 illustrates an example of step 1880, wherein the parameters of a parametrized 8 bit nonlinear transformation 132 are derived from minimum contrast curve 2204 of FIG. 22. FIG. 23 shows several curves indicating ΔC/C (2220) as a function of C (2210): curve 2204 of FIG. 22 and curves 2300, 2304, and 2306. Curve 2300 is a fit of ΔC/C(C) associated with the parametrized 8 bit nonlinear transformation 132 to curve 2204. Curve 2304 is a minimum contrast curve ΔC/C(C) associated with a conventional pure gamma 1/2.4 encoding. Curve 2306 is a minimum contrast curve ΔC/C(C) associated with a conventional Rec 709 encoding.

Curve 2300 is based on parametrization of nonlinear transformation 132 using the derivative of a modified Naka-Rushton model. This model allows for a close fit to curve 2204. In contrast, the 8 bit Rec 709 (curve 2306) and pure gamma 1/2.4 (curve 2304) encodings deviate significantly from curve 2204, illustrating sub-optimal use of the 8 bit code space by these conventional encodings.

The functional form used to parametrize nonlinear transformation 132 in the example associated with curve 2300 is $$x = \left(\frac{c_1 + c_2 C^{m_1}}{1 + c_3 C^{m_1}}\right)^{m_2},$$

wherein the fit results in $m_1=0.1696$, $m_2=78.8448$, $c_1=0.45876$, $c_2=19.0373$, and $c_3=18.496$. The functional form of the corresponding inverse transformation 142 is $$C = \left\{\frac{\max(0, x^{1/m_2} - c_1)}{c_2 - c_3 x^{1/m_2}}\right\}^{1/m_1}.$$

Figure 24A:
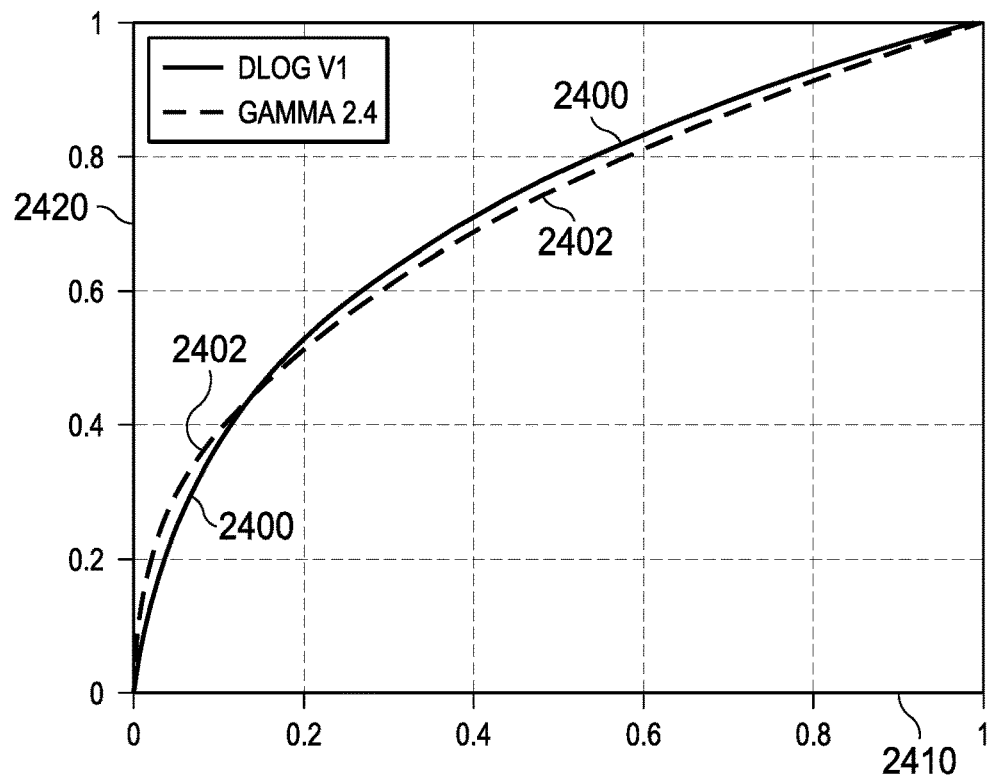
FIGS. 24A and 24B illustrate an example nonlinear transformation and a corresponding example inverse transformation.
Figure 24B:
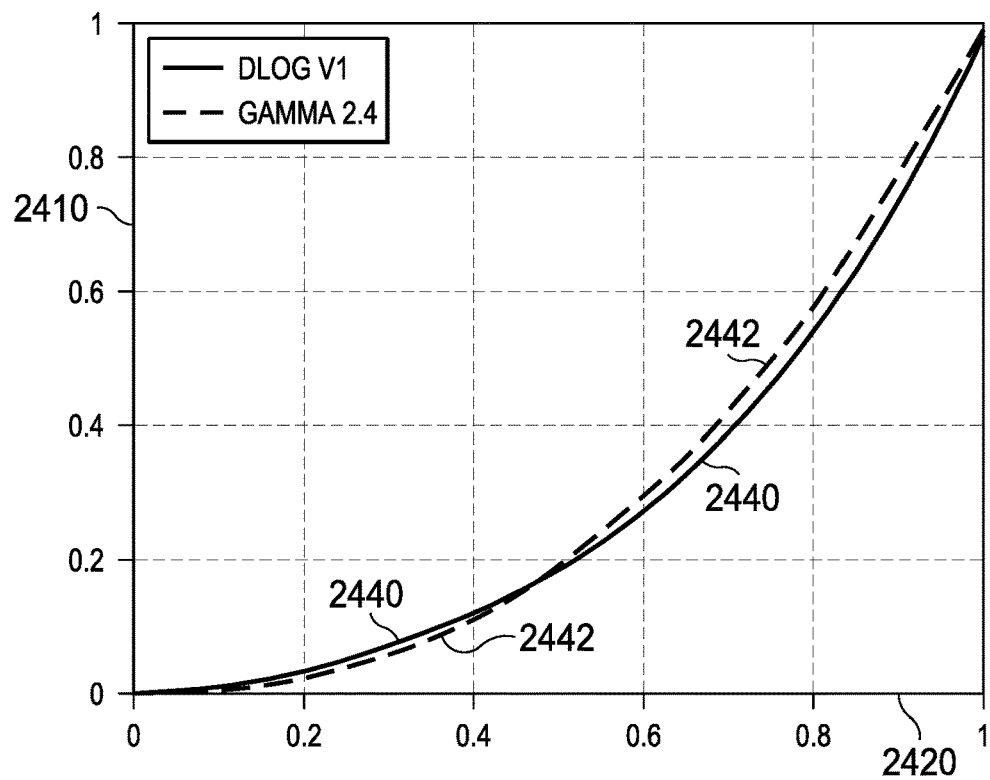

FIGS. 24A and 24B illustrate an example nonlinear transformation 132 and corresponding example inverse transformation 142 associated with curve 2300 of FIG. 23. FIG. 24A plots a nonlinear transformation 2400 (the example of nonlinear transformation 132 associated with curve 2300) as output relative code value 2420 as a function of relative camera signal 2410. FIG. 24A also shows a conventional gamma 2.4 encoding 2402. FIG. 24B plots an inverse transformation 2440 (the example of inverse transformation 142 associated with curve 2300) as relative camera signal 2410 as a function of output relative code value 2420. FIG. 24B also shows a conventional gamma 1/2.4 decoding 2442.

Example II: Nonlinear Transformation Used to Pre-Shape Analog Signal

FIGS. 25-28 illustrate, by examples, the effect of applying nonlinear transformation 1332 to pre-shape analog signals 1290 prior to analog-to-digital conversion by reduced-bit-depth ADC 1340.

Figure 25:
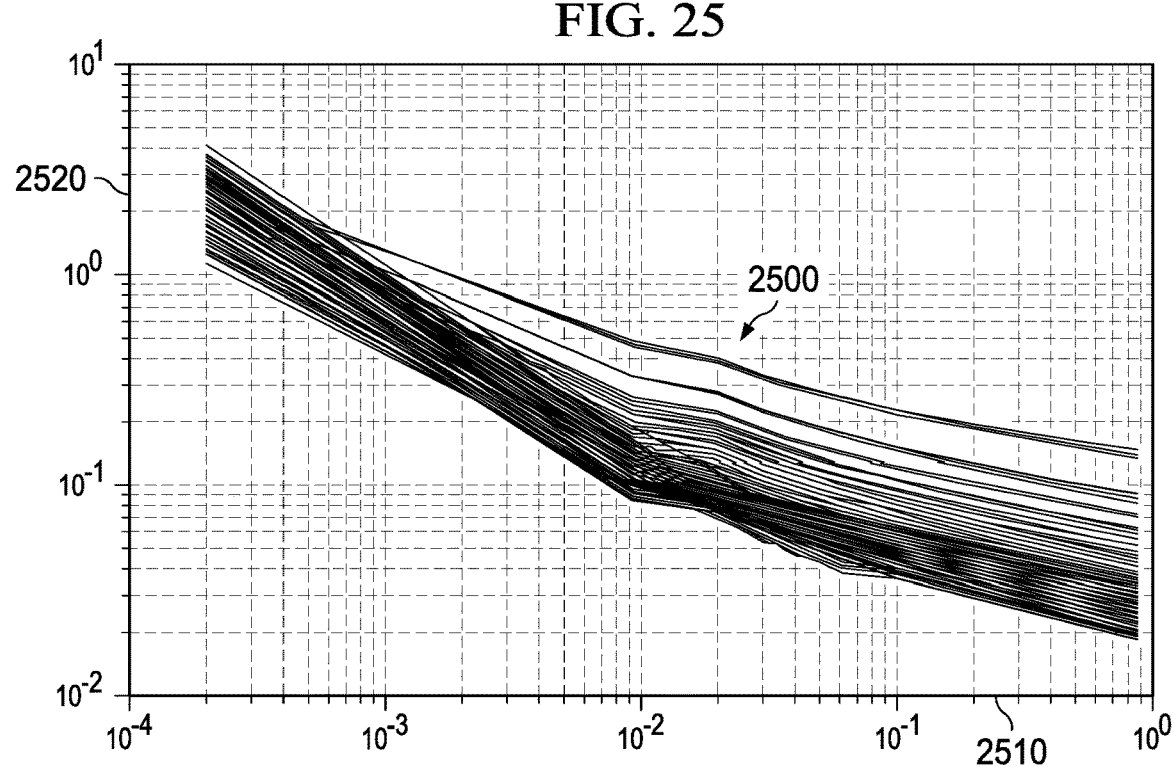
FIG. 25 shows an example of required bit depth as a function of noise level based upon an expanded study.

FIG. 25 shows the results of a study where a cohort of observers were presented with a set of images each having a shallow brightness gradient. The study underlying FIG. 25 is an expanded version of the study underlying FIG. 16. FIG. 25 plots a group of curves 2500, each indicating ΔC/C (2520) as a function of C (2510) determined in step 1870 of method 1800.

Figure 26:
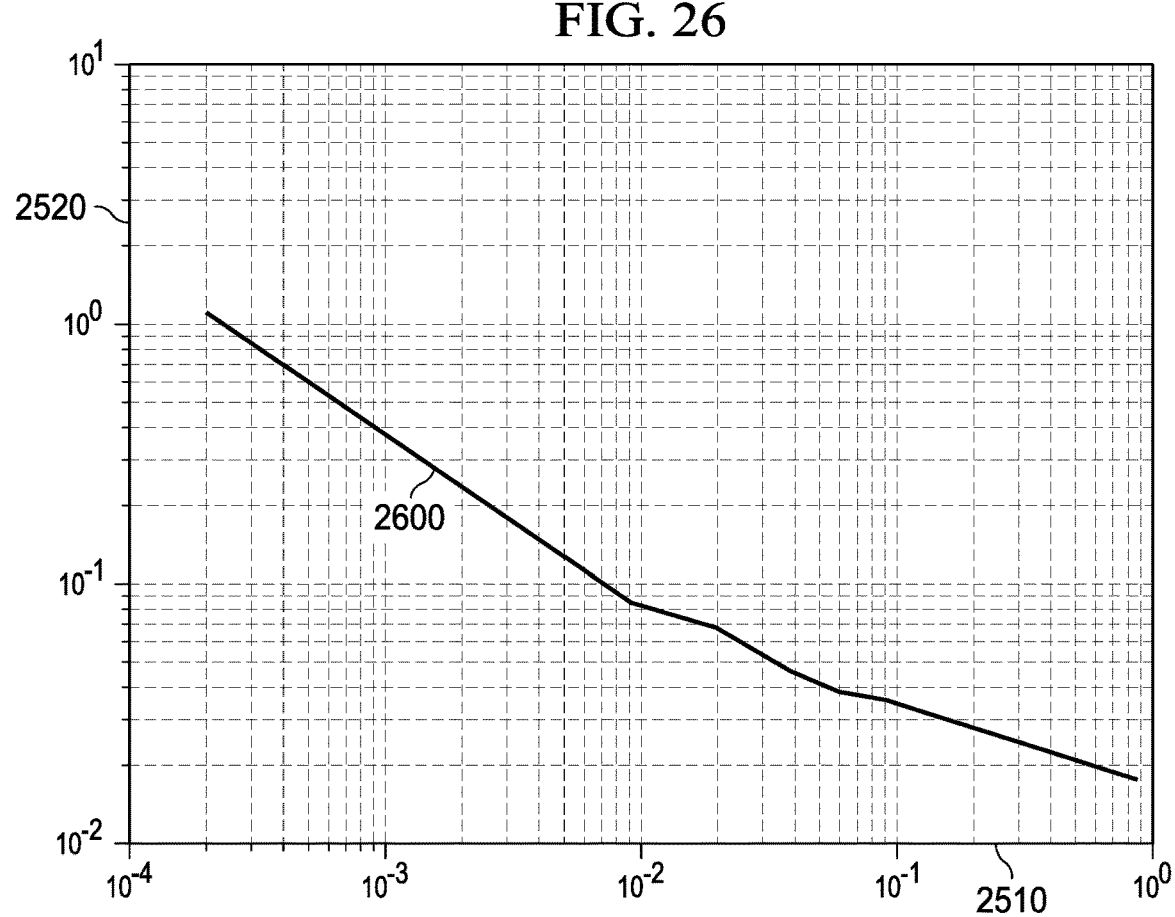
FIG. 26 shows an example minimum relative contrast curve associated with the required bit depth of FIG. 25.

FIG. 26 shows a curve 2600 indicating the minimum relative contrast ΔC/C for the group of curves 2500 of FIG. 25, as a function of C.

Figure 27:
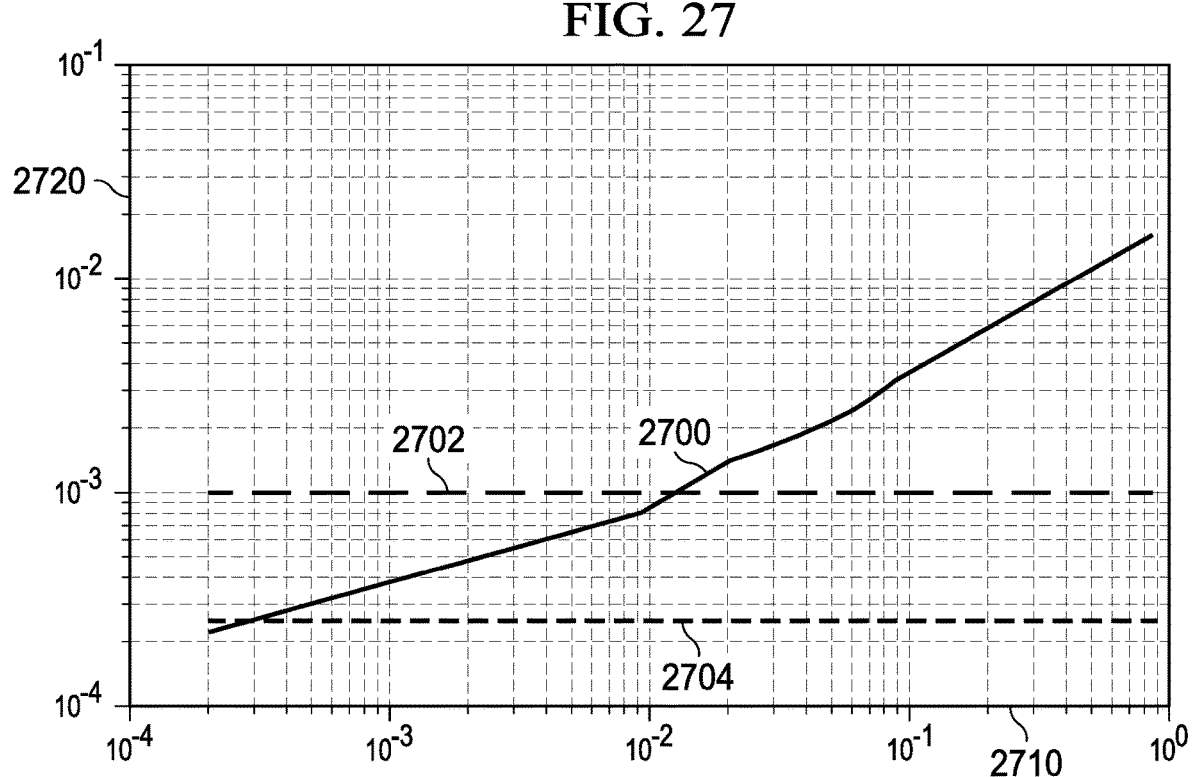
FIG. 27 is an alternative representation of the data of FIG. 26.

FIG. 27 replots the data of FIG. 26 as a curve 2700 indicating min(ΔC) (2720) as a function of C (2710). FIG. 27 also shows lines 2702 and 2704 indicating relative code changes for ADCs having bit depths of 10 bits and 12 bits, respectively. In the case of the 10 bit ADC (line 2702), it can be seen that (for the Google Pixel camera) contour artifacts caused by limited bit depth resolution of the ADC would be observed below a relative camera signal of approximately 0.01. However, above 0.01 the contrast would fall below the visibility threshold. Even with a 12 bit ADC (line 2704) this problem would exist, albeit at even lower sensor code values. Therefore, with an N-bit (e.g. 10) ADC, it is possible to construct a shallow gradient image such that visible contours will exist—even in the presence of analog noise present prior to the ADC. For wide dynamic range imaging applications, where the sensor code space is stretched over a larger display luminance range (via the OOTF), reducing any visible contours can significantly improve the rendered image quality.

Figure 28:
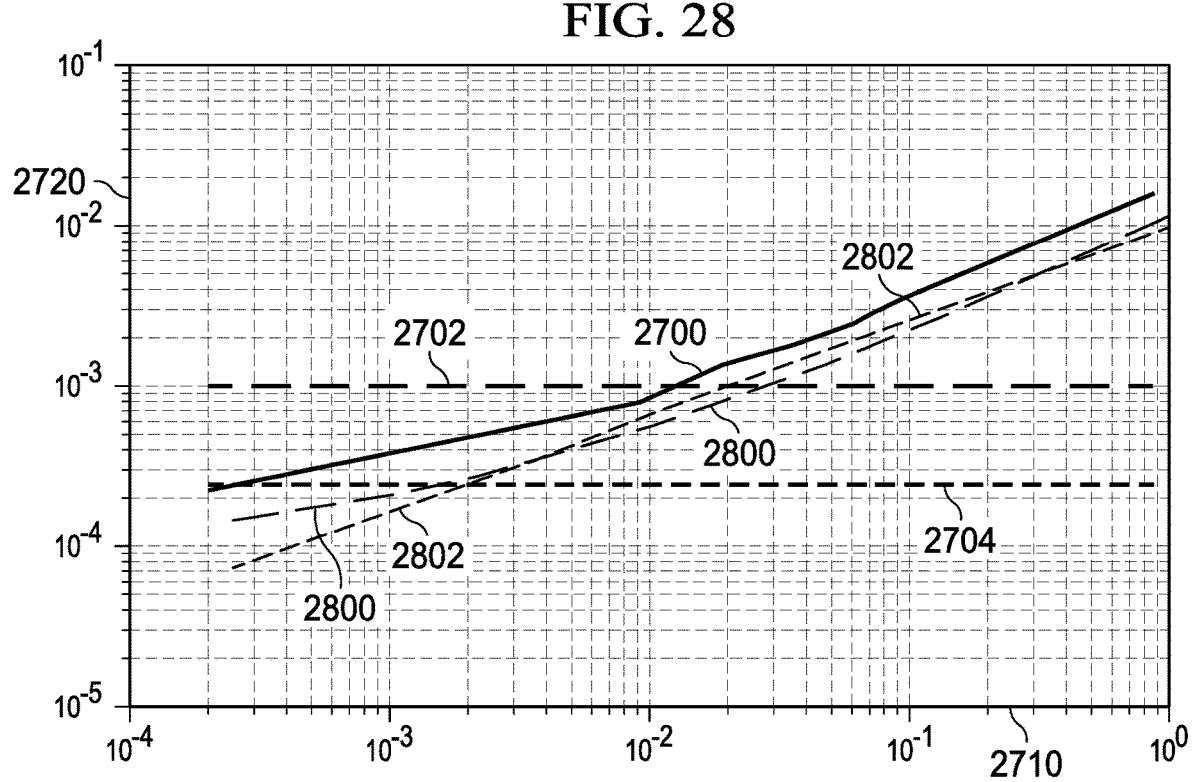
FIG. 28 illustrates an example of contour visibility performance provided by the image sensor of FIG. 13.

FIG. 28 illustrates an example of contour visibility performance provided by image sensor 1300. FIG. 28 plots several curves indicating min(ΔC) (2720) as a function of C (2710): curves 2800 and 2802, as well as curve 2700 and lines 2702 and 2704 of FIG. 27. Curve 2800 is similar to curve 2700 of FIG. 27, except that curve 2800 is based upon use of an embodiment of image sensor 1300 that (a) implements nonlinear transformation 2400 of FIG. 24 as nonlinear transformation 1332 and (b) uses a reduced-bit-depth ADC 1340 having a bit depth of 8 bits. The example of curve 2800 demonstrates that, by virtue of nonlinear transformation 1332, it is possible to replace a 10 bit or 12 bit ADC with an 8 bit ADC while staying below the contour visibility threshold indicated by curve 2700. Curve 2802 is similar to curve 2800 except for being based upon an embodiment of image sensor 1300 that implements a gamma 1/2.4 function as nonlinear transformation 1332. The gamma 1/2.4 based embodiment also allows for staying below the contour visibility threshold indicated by curve 2700 while using an 8 bit ADC. However, when taking into account noise reduction processes that may take place in an ISP coupled with image sensor 1300, nonlinear transformation 2400 may perform better than the gamma 1/2.4 function.

Enumerated Embodiments

Features described above as well as those claimed below may be combined in various ways without departing from the scope hereof. For example, it will be appreciated that aspects of one system, method, or device for bit-depth efficient image processing described herein may incorporate or swap features of another system, method, or device for bit-depth efficient image processing described herein. The following examples illustrate some possible, non-limiting combinations of embodiments described above. It should be clear that many other changes and modifications may be made to the devices, systems, and methods herein without departing from the spirit and scope of this invention:

(A1) A computer-implemented method for bit-depth efficient image processing may include (a) communicating at least one non-linear transformation to an image signal processor, wherein each non-linear transformation is configured to, when applied by the image signal processor to a captured image having sensor signals encoded at a first bit depth, produce a nonlinear image that re-encodes the captured image at a second bit depth, while optimizing allocation of bit depth resolution in the nonlinear image for low contour visibility, (b) receiving the nonlinear image from the image signal processor, and (c) applying an inverse transformation, inverse to the nonlinear transformation used to produce the nonlinear image, to transform the nonlinear image to a re-linearized image at a third bit depth that is greater than the second bit depth.

(A2) In the method denoted as (A2), the second bit depth may be less than the first bit depth.

(A3) In either of the methods denoted as (A1) and (A2), each non-linear transformation may be configured to non-linearly distribute bit depth resolution, in the nonlinear image, according to a sensor-signal-dependent contour visibility threshold.

(A4) In the method denoted as (A3), the sensor-signal-dependent contour visibility threshold may define, for each digital value of the sensor signals, as encoded at the first bit depth, a minimum contour detectable in the presence of noise, wherein the noise includes native noise of an image sensor generating the captured image.

(A5) In the method denoted as (A4), the noise may further include noise introduced by pre-processing of the captured image after capture and prior to the step of receiving.

(A6) Any of the methods denoted as (A1) through (A5) may further include, after the step of applying and at the third bit depth, steps of transferring representation of the re-linearized image from scene-referred sensor-signal values to display-referred luminance values and encoding the re-linearized image, as represented by the display-referred luminance values, for subsequent decoding by a display or for output as a digital file.

(A7) In the method denoted as (A6), the step of encoding may include applying, to the re-linearized image, a quantizer configured to code a 10,000 nits display luminance range at a bit depth in range from 10 to 12 bits while non-linearly allocating bit depth resolution to reduce contour visibility.

(A8) In any of the methods denoted as (A1) through (A7), each nonlinear transformation may be configured to (i) be applied to the captured image with the sensor signals being encoded in initial code values and (ii) transform the initial code values to optimized code values that allocate greater bit depth resolution to a first range of the initial code values than a second range of the initial code values, wherein the first range is characterized by a lower contour visibility threshold than the second range and the step of receiving includes receiving the nonlinear image as encoded in the optimized code values.

(A9) Any of the methods denoted as (A1) through (A8) may include, in the step of receiving, receiving the nonlinear image from the image signal processor via an output of the image signal processor limited to the second bit depth.

(A10) In the method denoted as (A9), the second bit depth may be 8 bits, the third bit depth may be at least 10 bits.

(A11) In the method denoted as (A10), the first bit depth may be greater than 8 bits.

(A12) Any of the methods denoted as (A1) through (A11) may further include (1) in the step of communicating, communicating to the image signal processor a plurality of non-linear transformations respectively associated with a plurality of image capture modes, so as to enable the image signal processor to select and apply a specific one of the non-linear transformations according to image capture mode under which the captured image is captured, (2) receiving, from the image signal processor, metadata indicating the mode under which the captured image is captured, and (3) in the step of applying, transforming the image according to an inverse of the specific one of the non-linear transformations.

(B1) A product for bit-depth efficient image processing may include machine-readable instructions encoded in non-transitory memory, wherein the instructions include (a) at least one non-linear transformation, each configured to transform a captured image, encoding sensor signals at a first bit depth, to produce a nonlinear image that re-encodes the sensor signals at a second bit depth, while optimizing allocation of bit depth resolution in the nonlinear image for low contour visibility, (b) for each non-linear transformation, a corresponding inverse transformation, (c) hardware instructions that, when executed by a processor, communicate the at least one non-linear transformation to an image signal processor, to enable the image processor to produce the nonlinear image from a captured image, and (d) application domain instructions including inverting instructions that, when executed by the processor, receive the nonlinear image from the image signal processor and apply the inverse transformation corresponding to the nonlinear transformation used to produce the nonlinear image, to produce a re-linearized image at a third bit depth that is greater than the second bit depth.

(B2) In the product denoted as (B1), the second bit depth may be less than the first bit depth.

(B3) In either of the products denoted as (B1) and (B2), each non-linear transformation may be configured to non-linearly distribute bit depth resolution, in the nonlinear image, according to a sensor-signal-dependent contour visibility threshold.

(B4) In the product denoted as (B3), the sensor-signal-dependent contour visibility threshold may define, for each value of the sensor signals, as encoded at the first bit depth, a minimum sensor-signal contour detectable in presence of noise, wherein the noise includes native noise of an image sensor generating the captured image.

(B5) In the product denoted as (B4), the noise may further include noise introduced in pre-processing of the captured image prior to application of the nonlinear transformation.

(B6) In any of the products denoted as (B1) through (B5), the application domain instructions may further include quantization instructions that, when executed by the processor, (i) transfer representation of the re-linearized image from scene-referred sensor-signal values to display-referred luminance values, and (ii) encode the re-linearized image, as represented by the display-referred luminance values, for subsequent decoding by a display or for output as a digital file.

(B7) In the product denoted as (B6), the quantization instructions may include, to encode the re-linearized image represented by the display-referred luminance values, a quantizer configured to code a 10,000 nits display luminance range at a bit depth in range from 10 to 12 bits while non-linearly allocating bit depth resolution to reduce contour visibility.

(B8) In any of the products denoted as (B1) through (B7), the at least one non-linear transformation may include a plurality of non-linear transformations, and a corresponding plurality of inverse transformations, respectively associated with a plurality of image capture modes, so as to enable the image signal processor to select and apply a specific one of the non-linear transformations according to image capture mode under which the captured image is captured, and the inverting instructions may be configured to, when executed by the processor, receive metadata indicating the capture mode under which the captured image is captured, and apply a corresponding one of the inverse transformations to produce a re-linearized-luminance image.

(B9) Any of the products denoted as (B1) through (B8) may be configured for implementation in an application domain of a cellular phone.

(C1) A method for bit-depth efficient analog-to-digital conversion of an image may include (a) receiving a plurality of analog signals representing light detected by a respective plurality of photosensitive pixels of an image sensor, (b) converting the analog signals to digital signals at a first bit depth, and (c) prior to the step of converting, applying a nonlinear transformation to the analog signals to optimize allocation of bit depth resolution, to the digital signals, for low contour visibility.

(C2) The method denoted as (C1) may further include inverting the nonlinear transformation by applying a corresponding inverse transformation to the digital signals, wherein the inverse transformation encodes the digital signals at a second bit depth that is greater than the first bit depth.

(C3) In either of the methods denoted as (C1) and (C2), the step of applying may include allocating greater bit depth resolution to a first range of the analog signals than a second range of the analog signals, wherein the first range is characterized by a lower contour visibility threshold than the second range.

(C4) In any of the methods denoted as (C1) through (C3), the first bit depth may be 8 bits.

(C5) Any of the methods denoted as (C1) through (C4) may be performed onboard the image sensor.

(C6) In the method denoted as (C5), the step of applying may include optimizing the allocation of bit depth resolution while accounting for effect of noise on the contour visibility.

(C7) In the method denoted as (C6), the noise may include native noise of the image sensor.

(C8) Any of the methods denoted as (C5) through (C7) may include performing the steps of receiving, converting, applying, and inverting within each column readout circuit of the image sensor.

(C9) In any of the methods denoted as (C1) through (C8), the step of applying may include applying, to the analog signals, one or more non-linear functions selected from the group consisting of a gamma function and a logarithmic function.

(D1) An image sensor with bit-depth efficient analog-to-digital image conversion may include (a) a plurality of photosensitive pixels for generating a respectively plurality of analog signals representing light detected by the photosensitive pixels, (b) at least one analog-to-digital converter for converting the analog signals to digital and having a first bit depth, and (c) at least one analog preshaping circuit, communicatively coupled between the photosensitive pixels and the at least one analog-to-digital converter, for applying a nonlinear transformation to the analog signals to optimize allocation of bit depth resolution, to the digital signals by the analog-to-digital converter, for low contour visibility in presence of noise of the analog signals.

(D2) The image sensor denoted as (D1) may further include at least one digital inverting circuit for inverting the nonlinear transformation by applying a corresponding inverse transformation to the digital signals, wherein the inverse transformation encodes the digital signals at a second bit depth that is greater than the first bit depth.

(D3) In either of the image sensors denoted as (D1) and (D2), the analog preshaping circuit may implement the nonlinear transformation, at least in part, as one or more functions selected from the group consisting of a gamma function and a logarithmic function, wherein the digital inverting circuit stores the inverse transformation as a look-up table.

(D4) In any of the image sensors denoted as (D1) through (D4), the first bit depth may be 8 bits.

(D5) In any of the image sensors denoted as (D1) through (D4), the photosensitive pixels may be organized in an array having a plurality of columns, wherein each column is configured with column readout circuitry that includes a respective analog-to-digital converter, a respective analog preshaping circuit, and a respective digital inverting circuit.

(D6) In the image sensor denoted as (D5), for each column, the column readout circuitry may implement a column-specific instance of the nonlinear transformation that is calibrated to minimize contour visibility in presence of noise of the analog signals in the respective column.

Changes may be made in the above devices, systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present devices, systems, and methods, which, as a matter of language, might be said to fall therebetween.

Various aspects of the present invention may be appreciated from the following enumerated example embodiments (EEEs), which are not claims:

1. A computer-implemented method for bit-depth efficient image processing, comprising:
    communicating at least one non-linear transformation to an image signal processor, each non-linear transformation being configured to, when applied by the image signal processor to a captured image having sensor signals encoded at a first bit depth, produce a nonlinear image that re-encodes the captured image at a second bit depth, while optimizing allocation of bit depth resolution in the nonlinear image for low contour visibility,
    receiving the nonlinear image from the image signal processor; and
    applying an inverse transformation, inverse to the non-linear transformation used to produce the nonlinear image, to transform the nonlinear image to a re-linearized image at a third bit depth that is greater than the second bit depth.

2. The method of EEE 1, the second bit depth being less than the first bit depth.

3. The method of EEE 1 or 2, each non-linear transformation being configured to non-linearly distribute bit depth resolution, in the nonlinear image, according to a sensor-signal-dependent contour visibility threshold.

4. The method of EEE 3, the sensor-signal-dependent contour visibility threshold defining, for each digital value of the sensor signals, as encoded at the first bit depth, a minimum contour detectable in the presence of noise, the noise including native noise of an image sensor generating the captured image.

5. The method of EEE 4, the noise further including noise introduced by pre-processing of the captured image after capture and prior to the step of receiving.

6. The method of any preceding EEE, further comprising, after the step of applying and at the third bit depth:
    transferring representation of the re-linearized image from scene-referred sensor-signal values to display-referred luminance values; and encoding the re-linearized image, as represented by the display-referred luminance values, for subsequent decoding by a display or for output as a digital file.

7. The method of EEE 6, the step of encoding comprising applying, to the re-linearized image, a quantizer configured to code a 10,000 nits display luminance range at a bit depth in range from 10 to 12 bits while non-linearly allocating bit depth resolution to reduce contour visibility.

8. The method of any preceding EEE, each nonlinear transformation being configured to (a) be applied to the captured image with the sensor signals being encoded in initial code values and (b) transform the initial code values to optimized code values that allocate greater bit depth resolution to a first range of the initial code values than a second range of the initial code values, the first range being characterized by a lower contour visibility threshold than the second range, the step of receiving comprising receiving the nonlinear image as encoded in the optimized code values.

9. The method of any preceding EEE, comprising:
in the step of receiving, receiving the nonlinear image from the image signal processor, via an output of the image signal processor limited to the second bit depth.

10. The method of EEE 9, the second bit depth being 8 bits, the third bit depth being at least 10 bits.

11. The method of EEE 10, the first bit depth being greater than 8 bits.

12. The method of any preceding EEE, further comprising:
in the step of communicating, communicating to the image signal processor a plurality of non-linear transformations respectively associated with a plurality of image capture modes, so as to enable the image signal processor to select and apply a specific one of the non-linear transformations according to image capture mode under which the captured image is captured;
receiving, from the image signal processor, metadata indicating the mode under which the captured image is captured; and
in the step of applying, transforming the image according to an inverse of the specific one of the non-linear transformations.

13. A product for bit-depth efficient image processing, comprising machine-readable instructions encoded in non-transitory memory, the instructions including:
at least one non-linear transformation, each configured to transform a captured image, encoding sensor signals at a first bit depth, to produce a nonlinear image that re-encodes the sensor signals at a second bit depth, while optimizing allocation of bit depth resolution in the nonlinear image for low contour visibility;
for each non-linear transformation, a corresponding inverse transformation;
hardware instructions that, when executed by a processor, communicate the at least one non-linear transformation to an image signal processor, to enable the image processor to produce the nonlinear image from a captured image; and
application domain instructions including inverting instructions that, when executed by the processor, receive the nonlinear image from the image signal processor and apply the inverse transformation corresponding to the nonlinear transformation used to produce the nonlinear image, to produce a re-linearized image at a third bit depth that is greater than the second bit depth.

14. The product of EEE 13, the second bit depth being less than the first bit depth.

15. The product of EEE 13 or 14, each non-linear transformation being configured to non-linearly distribute bit depth resolution, in the nonlinear image, according to a sensor-signal-dependent contour visibility threshold.

16. The product of EEE 15, the sensor-signal-dependent contour visibility threshold defining, for each value of the sensor signals, as encoded at the first bit depth, a minimum sensor-signal contour detectable in presence of noise, the noise including native noise of an image sensor generating the captured image.

17. The product of EEE 16, the noise further including noise introduced in pre-processing of the captured image prior to application of the nonlinear transformation.

18. The product of any one of EEEs 13 to 17, the application domain instructions further comprising quantization instructions that, when executed by the processor, (a) transfer representation of the re-linearized image from scene-referred sensor-signal values to display-referred luminance values, and (b) encode the re-linearized image, as represented by the display-referred luminance values, for subsequent decoding by a display or for output as a digital file.

19. The product of EEE 18, the quantization instructions including, to encode the re-linearized image represented by the display-referred luminance values, a quantizer configured to code a 10,000 nits display luminance range at a bit depth in range from 10 to 12 bits while non-linearly allocating bit depth resolution to reduce contour visibility.

20. The product of any one of EEEs 13 to 19,
the at least one non-linear transformation comprising a plurality of non-linear transformations, and a corresponding plurality of inverse transformations, respectively associated with a plurality of image capture modes, so as to enable the image signal processor to select and apply a specific one of the non-linear transformations according to image capture mode under which the captured image is captured; and
the inverting instructions being configured to, when executed by the processor, receive metadata indicating the capture mode under which the captured image is captured, and apply a corresponding one of the inverse transformations to produce a re-linearized-luminance image.

21. The product of any one of EEEs 13 to 20, configured for implementation in application domain of a cellular phone.

22. A method for bit-depth efficient analog-to-digital conversion of an image, comprising:
receiving a plurality of analog signals representing light detected by a respective plurality of photosensitive pixels of an image sensor;
converting the analog signals to digital signals at a first bit depth;
prior to the step of converting, applying a nonlinear transformation to the analog signals to optimize allocation of bit depth resolution, to the digital signals, for low contour visibility; and 23. The method of EEE 22, further comprising inverting the nonlinear transformation by applying a corresponding inverse transformation to the digital signals, the inverse transformation encoding the digital signals at a second bit depth that is greater than the first bit depth.

24. The method of EEE 22 or 23, the step of applying comprising allocating greater bit depth resolution to a first range of the analog signals than a second range of the analog signals, the first range being characterized by a lower contour visibility threshold than the second range.

25. The method of any one of EEEs 22 to 24, the first bit depth being 8 bits.

26. The method of any one of EEEs 22 to 25, being performed onboard the image sensor.

27. The method of EEE 26, the step of applying comprising optimizing the allocation of bit depth resolution while accounting for effect of noise on the contour visibility.

28. The method of EEE 27, the noise including native noise of the image sensor.

29. The method of EEE 26, comprising performing the steps of receiving, converting, applying, and inverting within each column readout circuit of the image sensor.

30. The method of any one of EEEs 22 to 29, the step of applying comprising applying, to the analog signals, one or more non-linear functions selected from the group consisting of a gamma function and a logarithmic function.

31. An image sensor with bit-depth efficient analog-to-digital image conversion, comprising:
a plurality of photosensitive pixels for generating a respectively plurality of analog signals representing light detected by the photosensitive pixels;
at least one analog-to-digital converter for converting the analog signals to digital and having a first bit depth;
at least one analog preshaping circuit, communicatively coupled between the photosensitive pixels and the at least one analog-to-digital converter, for applying a nonlinear transformation to the analog signals to optimize allocation of bit depth resolution, to the digital signals by the analog-to-digital converter, for low contour visibility in presence of noise of the analog signals.

32. The image sensor of EEE 31, further comprising at least one digital inverting circuit for inverting the nonlinear transformation by applying a corresponding inverse transformation to the digital signals, the inverse transformation encoding the digital signals at a second bit depth that is greater than the first bit depth.

33. The image sensor of EEE 31 or 32, the analog preshaping circuit implementing the nonlinear transformation, at least in part, as one or more functions selected from the group consisting of a gamma function and a logarithmic function, the digital inverting circuit storing the inverse transformation as a look-up table.

34. The image sensor of any one of EEEs 31 to 33, the first bit depth being 8 bits.

35. The image sensor of any one of EEEs 31 to 34, the photosensitive pixels being organized in an array having a plurality of columns, each column being configured with column readout circuitry that includes a respective analog-to-digital converter, a respective analog preshaping circuit, and a respective digital inverting circuit.

36. The image sensor of EEE 35, for each column, the column readout circuitry implementing a column-specific instance of the nonlinear transformation that is calibrated to minimize contour visibility in presence of noise of the analog signals in the respective column.

The invention claimed is:

1. A computer-implemented method for image processing by a device comprising an image sensor for capturing an image having a first bit depth, a capture mode controller configured to control the image sensor for image capture under a plurality of capture modes, an image signal processor configured to produce from an image captured by the image sensor, by applying a non-linear transformation and re-encoding, a non-linearized image, and an inverter configured to produce from an image produced by the image signal processor, by applying an inverse transformation and re-encoding, a re-linearized image, the method comprising:

providing a plurality of non-linear transformations each associated with a different capture mode of the plurality of capture modes, controlling, by the capture mode controller, of the image sensor to capture an image under one of the capture modes, the image having sensor signals encoded at the first bit depth, communicating, by the capture mode controller, at least the one non-linear transformation associated with the capture mode under which the image was captured by the image sensor to the image signal processor, applying the one non-linear transformation to the captured image and re-encoding, by the image signal processor, to produce from the captured image a non-linearized image that has code values characterizing the sensor signals of the captured image non-linearly distributed across a second bit depth less than the first bit depth, providing a plurality of inverse transformations each inverse to a different non-linear transformation of the plurality of non-linear transformations, receiving from the image signal processor, by the inverter, the non-linearized image, receiving, from the capture mode controller, a capture-mode specification indicating the capture mode under which the captured image was captured by the image sensor, selecting, based upon the capture-mode specification, from the plurality of inverse transformations the one inverse transformation inverse to the one non-linear transformation used to produce the non-linearized image; and applying the one inverse transformation to the non-linearized image and re-encoding, by the inverter, to produce from the non-linearized image a re-linearized image that has code values characterizing the sensor signals of the captured image linearly distributed across a third bit depth greater than the second bit depth.

2. The method of claim 1, wherein each non-linear transformation is determined based on noise characteristics of sensor signals encoded at the first bit depth by the captured image.

3. The method of claim 2, wherein the noise characteristics of the sensor signals comprise a mapping of code value levels of the sensor signals to corresponding values of a noise standard deviation for said code value levels.

4. The method of claim 1, wherein each non-linear transformation comprises a concave function for mapping initial code values of the captured image to optimized code values of the non-linearized image.

5. The method of claim 1, wherein each non-linear transformation is configured to produce the non-linearized image such that an average noise level of the non-linearized image is increased compared to an average noise level of the captured image.

6. The method of claim 1, wherein each non-linear transformation allocates a relatively greater portion of the second bit depth to less noisy ranges of the sensor signals of the captured image and allocates a relatively smaller portion of the second bit depth to more noisy ranges of the sensor signals of the captured image.

7. The method of claim 1, wherein each non-linear transformation allocates a relatively greater portion of the second bit depth to a lower range of the sensor signals and allocates a relatively smaller portion of the second bit depth to a higher range of the sensor signals.

8. The method of claim 1, each non-linear transformation being configured to non-linearly distribute bit depth resolution, in the non-linearized image, according to a sensor-signal-dependent contour visibility threshold.

9. The method of claim 8, the sensor-signal-dependent contour visibility threshold defining, for each digital value of the sensor signals, as encoded at the first bit depth, a minimum contour detectable in the presence of noise, the noise including (a) native noise of the image sensor generating the captured image and (b) noise introduced by pre-processing of the captured image after capture and prior to the step of receiving from the image signal processor, by the inverter, the non-linearized image.

10. The method of claim 1, further comprising, after the step of producing the re-linearized image at the third bit depth: transferring representation of the re-linearized image from scene-referred sensor-signal values to display-referred luminance values; and
encoding the re-linearized image, as represented by the display-referred luminance values, for subsequent decoding by a display or for output as a digital file.

11. The method of claim 1, each non-linear transformation being configured to transform (a) initial code values of the sensor signal of the captured image into (b) optimized code values of the non-linearized image, wherein said optimized code values allocate greater bit depth resolution to a first range of the initial code values than a second range of the initial code values, the first range being characterized by a lower contour visibility threshold than the second range, the step of receiving from the image signal processor comprising receiving the non-linearized image as encoded in the optimized code values.

12. The method of claim 1, comprising:
in the step of receiving, by the inverter, the non-linearized image from the image signal processor, receiving, by the inverter, the non-linearized image from the image signal processor, via an output of the image signal processor limited to the second bit depth.

13. The method of claim 1, further comprising:
in the step of communicating, communicating to the image signal processor the plurality of non-linear transformations respectively associated with the plurality of image capture modes, so as to enable the image signal processor to select and apply a specific one of the non-linear transformations according to image capture mode under which the captured image is captured;
receiving, from the image signal processor, metadata indicating the mode under which the captured image is captured; and
in the step of applying the one inverse transformation to the non-linearized image and re-encoding, transforming the image according to an inverse of the specific one of the non-linear transformations.

14. A device incorporating an electronic camera configured to perform the method according to claim 1.

15. A product for image processing by a device comprising an image sensor for capturing an image having a first bit depth, a capture mode controller configured to control the image sensor for image capture under a plurality of capture modes, an image signal processor configured to produce from an image captured by the image sensor, by applying a non-linear transformation and re-encoding, a non-linearized image, and an inverter configured to produce from an image produced by the image signal processor, by applying an inverse transformation and re-encoding, a re-linearized image, comprising machine-readable instructions, the instructions including:
a plurality of non-linear transformations each associated with a different capture mode of the plurality of capture modes;
for each non-linear transformation, a corresponding inverse transformation;
hardware instructions that, when executed by a processor, communicate to the image signal processor at least the one non-linear transformation associated with the capture mode under which an image having sensor signals encoded at the first bit depth was captured by the image sensor, to enable the image processor to produce from the captured image, by applying to the captured image the one non-linear transformation and re-encoding, a non-linearized image that has code values characterizing the sensor signals of the captured image non-linearly distributed across a second bit depth less than the first bit depth; and
application domain instructions including inverting instructions that, when executed by the processor, receive from the image signal processor a non-linearized image produced by the image signal processor applying to a captured image the one non-linear transformation associated with the capture mode under which the captured image was captured by the image sensor; receive from the capture mode controller a capture-mode specification indicating the capture mode under which the captured image was captured by the image sensor; select, based upon the capture-mode specification, from the plurality of inverse transformations the one inverse transformation inverse to the one non-linear transformation used to produce the non-linearized image, and apply the one inverse transformation to the non-linearized image to produce from the non-linearized image, by applying to the non-linearized image the one inverse transformation and re-encoding, a re-linearized image that has code values characterizing the sensor signals of the captured image linearly distributed across a third bit depth greater than the second bit depth.

16. The product of claim 15, each non-linear transformation being configured to non-linearly distribute bit depth resolution, in the non-linearized image, according to a sensor-signal-dependent contour visibility threshold, dependent on sensor signals encoded at the first bit depth by the captured image.

17. The product of claim 16, the sensor-signal-dependent contour visibility threshold defining, for each value of the sensor signals, as encoded at the first bit depth, a minimum sensor-signal contour detectable in presence of noise, the noise including (a) native noise of the image sensor generating the captured image and (b) noise introduced in pre-processing of the captured image prior to application of the non-linear transformation.

18. The product of claim 15, the application domain instructions further comprising quantization instructions that, when executed by the processor, (a) transfer representation of the re-linearized image from scene-referred sensor-signal values to display-referred luminance values, and (b) encode the re-linearized image, as represented by the display-referred luminance values, for subsequent decoding by a display or for output as a digital file.

19. The product of claim 15,
the at least one non-linear transformation comprising a plurality of non-linear transformations, and a corresponding plurality of inverse transformations, respectively associated with a plurality of image capture modes, so as to enable the image signal processor to select and apply a specific one of the non-linear transformations according to the image capture mode under which the captured image is captured; and the inverting instructions being configured to, when executed by the processor, receive metadata indicating the capture mode under which the captured image is captured, and apply a corresponding one of the inverse transformations to produce a re-linearized-luminance image.

20. The product of claim 15, configured for implementation in the application domain of a cellular phone.

* * * * *